US007512242B2

(12) United States Patent
Pearson et al.

(10) Patent No.: US 7,512,242 B2
(45) Date of Patent: Mar. 31, 2009

(54) SYSTEMS AND METHODS FOR QUANTUM CRYPTOGRAPHIC KEY TRANSPORT

(75) Inventors: David Spencer Pearson, Bennington, VT (US); Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 723 days.

(21) Appl. No.: 10/803,509

(22) Filed: Mar. 18, 2004

(65) Prior Publication Data

US 2004/0184603 A1 Sep. 23, 2004

Related U.S. Application Data

(60) Provisional application No. 60/456,624, filed on Mar. 21, 2003.

(51) Int. Cl.
*H04L 9/00* (2006.01)

(52) U.S. Cl. ......................... 380/281; 380/278; 380/44; 713/153; 713/201

(58) Field of Classification Search ................. 380/278, 380/281, 44; 713/153, 201
See application file for complete search history.

(56) References Cited

U.S. PATENT DOCUMENTS

| | | | |
|---|---|---|---|
| 4,649,233 | A | 3/1987 | Bass et al. |
| 5,243,649 | A | 9/1993 | Franson |
| 5,339,182 | A | 8/1994 | Kimble et al. |
| 5,414,771 | A | 5/1995 | Fawcett, Jr. |
| 5,502,766 | A | 3/1996 | Boebert et al. |
| 5,535,195 | A | 7/1996 | Lee |
| 5,675,648 | A | 10/1997 | Townsend |
| 5,710,773 | A | 1/1998 | Shiga |
| 5,732,139 | A | 3/1998 | Lo et al. |
| 5,757,912 | A | 5/1998 | Blow |
| 5,764,765 | A | 6/1998 | Phoenix et al. |
| 5,768,378 | A | 6/1998 | Townsend et al. |
| 5,768,391 | A | 6/1998 | Ichikawa |

(Continued)

FOREIGN PATENT DOCUMENTS

| | | |
|---|---|---|
| WO | WO 02/05480 | 1/2002 |

OTHER PUBLICATIONS

Bennett et al., "Quantum Cryptography: Public Key Distribution and Coin Tossing," International Conference on computers & Signal Processing, pp. 1-6, Dec. 1984.

(Continued)

*Primary Examiner*—Matthew B Smithers
*Assistant Examiner*—Paul Callahan
(74) *Attorney, Agent, or Firm*—Ropes & Gray LLP

(57) ABSTRACT

A system transports a key between a first node (505) at one end of a path (500) through a quantum cryptographic key distribution (QKD) network to a second node (525) at an opposite end of the path (500), where the QKD network includes multiple nodes. The system transmits secret bits between the multiple nodes of the QKD network using quantum cryptographic mechanisms. The system reserves (530), from the first node (505), portions of the transmitted secret bits at each intermediate node along the path between the first (505) and the second node (525). The system transports a key between the second node (525) and the first node (505) using the reserved portions (555, 560, 565, 575) of the transmitted secret bits.

25 Claims, 22 Drawing Sheets

U.S. PATENT DOCUMENTS

| | | | |
|---|---|---|---|
| 5,805,801 | A | 9/1998 | Holloway et al. |
| 5,850,441 | A | 12/1998 | Townsend et al. |
| 5,953,421 | A | 9/1999 | Townsend |
| 5,966,224 | A | 10/1999 | Hughes et al. |
| 6,122,252 | A | 9/2000 | Aimoto et al. |
| 6,188,768 | B1 | 2/2001 | Bethune |
| 6,233,075 | B1 | 5/2001 | Chang et al. |
| 6,233,393 | B1 | 5/2001 | Yanagihara et al. |
| 6,272,548 | B1 | 8/2001 | Cotter et al. |
| 6,430,345 | B1 | 8/2002 | Dultz et al. |
| 6,463,060 | B1 | 10/2002 | Sato et al. |
| 6,522,749 | B2 | 2/2003 | Wang |
| 6,563,796 | B1 | 5/2003 | Saito |
| 6,650,805 | B2 | 11/2003 | Chen et al. |
| 6,661,806 | B1 | 12/2003 | Eriksson et al. |
| 6,684,335 | B1 | 1/2004 | Epstein et al. |
| 2001/0038695 | A1 | 11/2001 | Kim |
| 2002/0015573 | A1 | 2/2002 | Ishibashi |
| 2002/0021467 | A1 | 2/2002 | Ofek et al. |
| 2003/0002670 | A1 | 1/2003 | Wang |
| 2003/0137944 | A1 | 7/2003 | Medvinsky |
| 2003/0215088 | A1 | 11/2003 | Bao |
| 2005/0036624 | A1 | 2/2005 | Kent et al. |
| 2006/0252381 | A1 | 11/2006 | Sasaoka et al. |

OTHER PUBLICATIONS

Brassard et al., "Cryptology Column—25 Years of Quantum Crytography," Pragocrypt, pp. 13-24, Jul. 1996.

Elliott, Chip "Building the Quantum Network," New Journal of Physics, 46(4):1-12, (2002).

Schneier, Bruce "Applied Cryptography," Second Edition, Chapter 10, Oct. 18, 1995, Wiley & Sons Publ, pp. 216-220.

Townsend et al. Single Photon Interference in 10km Long Optical Fibre Interferometer. Electronics Letters. 29:7, 634-35. (1993).

Townsend, P.D. Secure key distribution system based on quantum cryptography. Electronics Letters. 30:10, 809-11. (1994).

Franson, J.D. Violations of a New Inequality for Classical Fields. Johns Hopkins University; NTIS-NASA Publication; Goddard Space Flight Center; Workshop on Squeezed States and Uncertainty Relations. pp. 23-32. (1991).

Phoenix, Simon J.D. et al. Multi-user quantum cryptography on optical networks. Journal of Modern Optics. 42:6, 1155-63. (1995).

Townsend et al. Enhanced Single Photon Fringe Visibility in A 10 km-Long Prototype Quantum Cryptography Channel. Electronics Letters. 29:14, 1291-93. (1993).

Collins, Graham P. Quantum Cryptography Defies Eavesdropping. Physics Today. pp. 21-23 (1992).

Quamtum Public Key Distribution System. IBM Technical Disclosure Bulletin. 28:7, 3151-63. (1985).

U.S. Appl. No. 09/611,783, filed Jul. 7, 2000; entitled: "Systems and Method for Implementing a Quantum-Cryptographic Communications Network," 42 pages.

Co-pending application filed on Mar. 19, 2004; entitled "Systems and Methods for Implementing Routing Protocols and Algorithms for Quantum Cryptographic Key Transport" 41 pages.

Office action issued on Oct. 29, 2007 for U.S. Appl. No. 10/786,314.

Office action issued on Dec. 27, 2007 for U.S. Appl. No. 10/795,313.

Office action issued on Oct. 11, 2007 for U.S. Appl. No. 10/795,398.

Office action issued on Mar. 27, 2008 for U.S. Appl. No. 10/799,177.

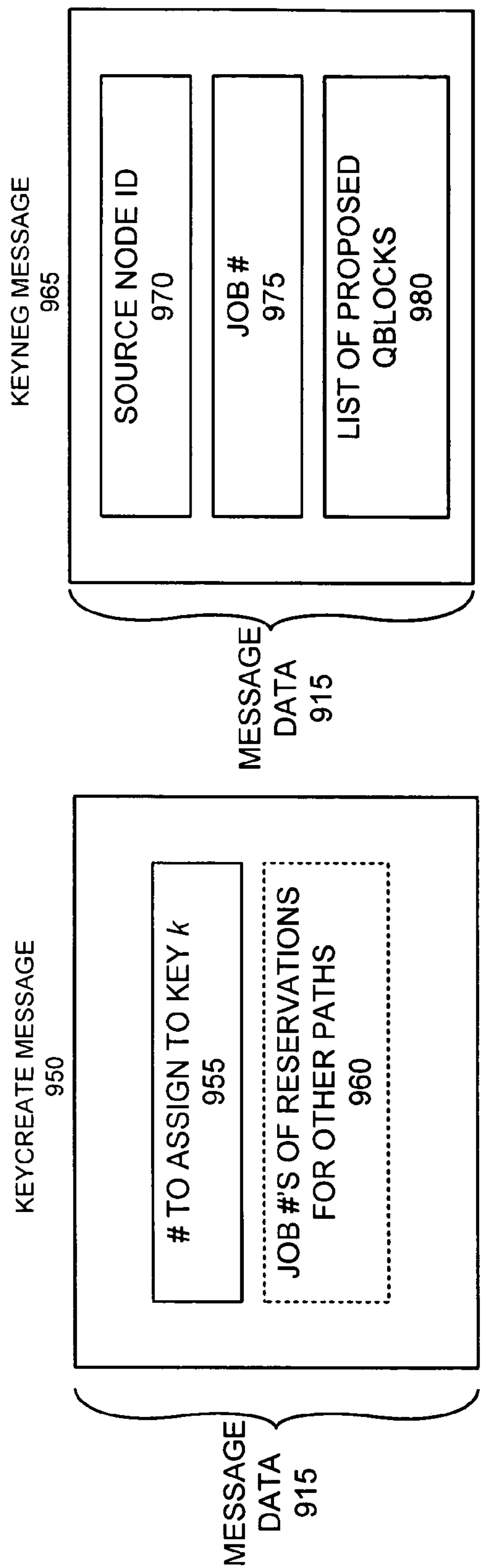
FIG. 9E
FIG. 9D
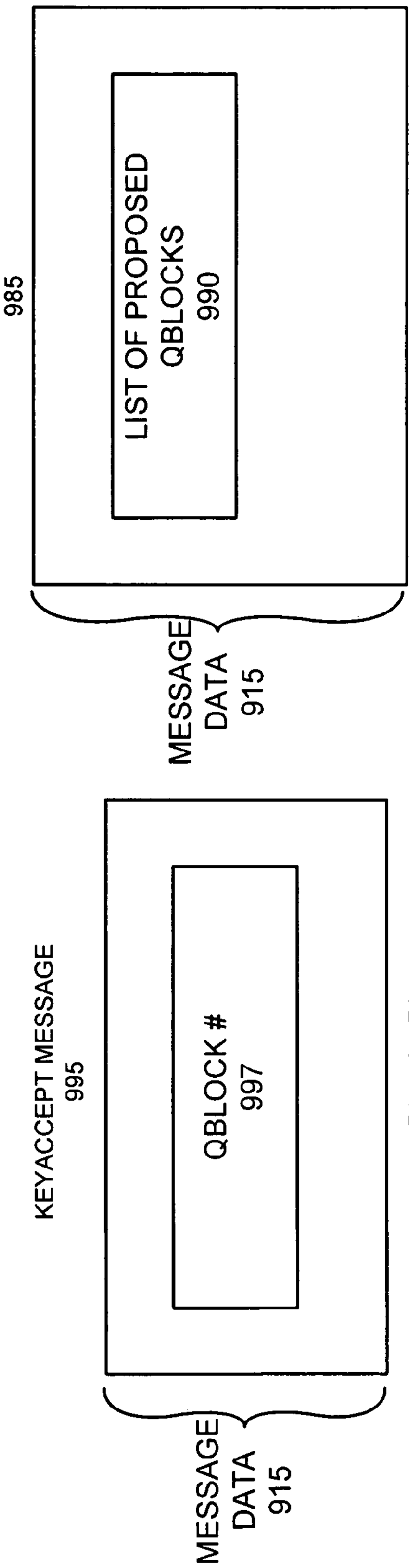
FIG. 9F
FIG. 9G

SYSTEMS AND METHODS FOR QUANTUM CRYPTOGRAPHIC KEY TRANSPORT

CROSS REFERENCE TO RELATED APPLICATION

The instant application claims priority from provisional application No. 60/456,624, filed Mar. 21, 2003, the disclosure of which is incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Projects Agency (DARPA).

RELATED APPLICATIONS

The present application is related to U.S. patent application Ser. No. 10/799,177, entitled "Systems and Methods for Implementing Routing Protocols and Algorithms for Quantum Cryptographic Key Transport," and filed on Mar. 12, 2004; and U.S. patent application Ser. No. 09/611,783 entitled "Systems and Methods for Implementing a Quantum-Cryptographic Communications Network," and filed on Jul. 7, 2000, the disclosures of which are incorporated by reference herein in their entirety.

FIELD OF THE INVENTION

The present invention relates generally to cryptographic systems and, more particularly, to systems and methods for implementing key transport in quantum cryptographic systems.

BACKGROUND OF THE INVENTION

Conventional packet-switching networks permit cheap and reliable communications independent of the distance between a source node and a destination node in the network. These conventional networks often rely upon either public keys or shared private keys to provide privacy for messages that pass through the network's links. Public key cryptographic systems have the drawback that they have never been proven to be difficult to decipher. Therefore, it is possible that a method of efficiently cracking public key systems may one day be discovered. Such a discovery could make all public key technology obsolete. All supposedly "secure" networks based on public key technology would thus become vulnerable. Shared private keys also have the drawback that the logistics of distributing the private keys can be prohibitive.

Quantum cryptography represents a recent technological development that provides for the assured privacy of a communications link. Quantum cryptography is founded upon the laws of quantum physics and permits the detection of eavesdropping across a link. Quantum cryptographic techniques have been conventionally applied to distribute keys from a single photon source to a single photon detector, either through fiber optic strands or through the air. Although this approach is perfectly feasible for scientific experiments, it does not provide the kind of "anyone to anyone" connectivity that is provided by current communications technology. Conventional quantum cryptographic techniques require a direct connection to anyone with whom one wishes to exchange keying material. Obviously, a large system built along these lines would be impractical, since it would require every person to have enough sources and/or detectors, and fiber strands so that they could employ a dedicated set of equipment for each party with whom they intend to communicate.

Furthermore, conventional quantum cryptographic techniques fail to adequately handle the situations in which eavesdropping is present on a link or when a dedicated link fails (e.g., a fiber is accidentally cut). In conventional quantum cryptographic techniques, further key distribution across the dedicated link becomes impossible until eavesdropping on the link ceases or the link is repaired. In addition, there may exist situations in which a single quantum cryptographic link may not be able to connect two endpoints, such as, for example, if the distance between the two endpoints causes too much signal attenuation, or because the two endpoints use different, incompatible optical encoding schemes.

It would, thus, be desirable to implement a quantum cryptographic network that could provide the "any to any" connectivity of conventional packet-switching networks, such as the Internet, while eliminating the need for a direct connection between parties transporting quantum cryptographic key material, and which may further sustain key distribution even with link failure and/or when eavesdropping exists on the link.

Therefore, there exists a need for systems and methods that combine the assured privacy achieved with quantum cryptography with the distance independent communication achieved with conventional multi-node, multi-link packet switching networks.

SUMMARY OF THE INVENTION

Systems and methods consistent with the present invention address this and other needs by implementing a multi-node quantum cryptographic key distribution (QKD) network that may transport secret keys from one end of the QKD network to another. Consistent with the present invention, after selection of a path through the QKD network for transporting one or more secret keys, a source node may send reservation requests to a destination node, and each intermediate node, along the selected path. The destination node, and each intermediate node, may share secret blocks of bits with one another in, for example, a pair-wise fashion using quantum cryptographic mechanisms. Each intermediate node may then logically combine a first secret block of bits shared with a previous hop along the selected path with a second secret block of bits shared with a next hop along the selected path. The logically combined blocks of bits may be sent back to the source node. The destination node may generate a random block of bits and logically combine the random block of bits with a secret block of bits shared with a previous hop node. The blocks of bits logically combined at the destination node may then be sent back to the source node. The source node may receive the logically combined blocks from the destination node, and each intermediate node, and may extract the random block of bits as the secret key through another logical manipulation. The extracted random block of bits may be used for encrypting subsequent traffic sent between the source node and the destination node across a public channel. Thus, consistent with the present invention, a multi-node, multi-link QKD network may be implemented that can transport keys across paths of the network using quantum cryptographic principles.

In accordance with the purpose of the invention as embodied and broadly described herein, a method of transporting a random block of bits in a QKD network is provided. The method includes sharing blocks of bits between nodes in a QKD network using quantum cryptographic mechanisms and determining a key transport path between a source node and a destination node in the QKD network, where the key transport path includes one or more intermediate nodes. The method further includes, at each intermediate node of the one or more intermediate nodes, logically combining a block of secret bits shared with a previous hop along the path with a block of secret bits shared with a next hop along the path to produce first combined blocks of bits. The method also includes, at the destination node, logically combining a block of secret bits shared with a previous hop along the path with a random block of bits to produce a second combined block of bits. The method additionally includes receiving the first combined blocks of bits and the second combined block of bits at the source node and logically combining, at the source node, the first combined blocks of bits and the second combined block of bits to determine the random block of bits.

In a further implementation consistent with the present invention, a method of end-to-end transport of a secret key in a QKD network is provided. The method includes determining multiple paths for end-to-end transport, employing QKD techniques, of the secret key across a QKD network and transporting the secret key across each of the determined multiple paths.

In an additional implementation consistent with the present invention, a method of transporting a key between a first node at one end of a path through a QKD network to a second node at an opposite end of the path, where the QKD network includes multiple nodes, is provided. The method includes transmitting secret bits between the multiple nodes of the QKD network using quantum cryptographic mechanisms. The method further includes reserving, from the first node, portions of the transmitted secret bits at each intermediate node along the path between the first and the second node and transporting a key between the second node and the first node using the reserved portions of the transmitted secret bits.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIGS. 9A-9G illustrate exemplary message data that may be transmitted across a path of a QKD network for implementing a key transport process consistent with the invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the present invention provide mechanisms for transporting secret keys from one end of a QKD network to another. Consistent with the invention, a source node may initiate a reservation process for reserving secret blocks of bits by sending reservation requests to a destination node, and each intermediate node, along a selected path through the QKD network. The destination node, and each intermediate node, may share secret blocks of bits with one another in, for example, a pair-wise fashion using quantum cryptographic mechanisms. The source node may further request that each intermediate node send a logical combination of a first block of secret bits shared with a previous hop node with a second block of secret bits shared with a next hop node. The source node may also request that the destination node send a logical combination of a block of secret bits shared with a previous hop node with a random block of bits generated at the destination node. The source node may receive the requested blocks and may logically manipulate the blocks to retrieve the random block of bits generated at the destination node. The retrieved random block of bits may be used for encrypting subsequent public communications between the source node and the destination node.

Exemplary Network

Figure 1:
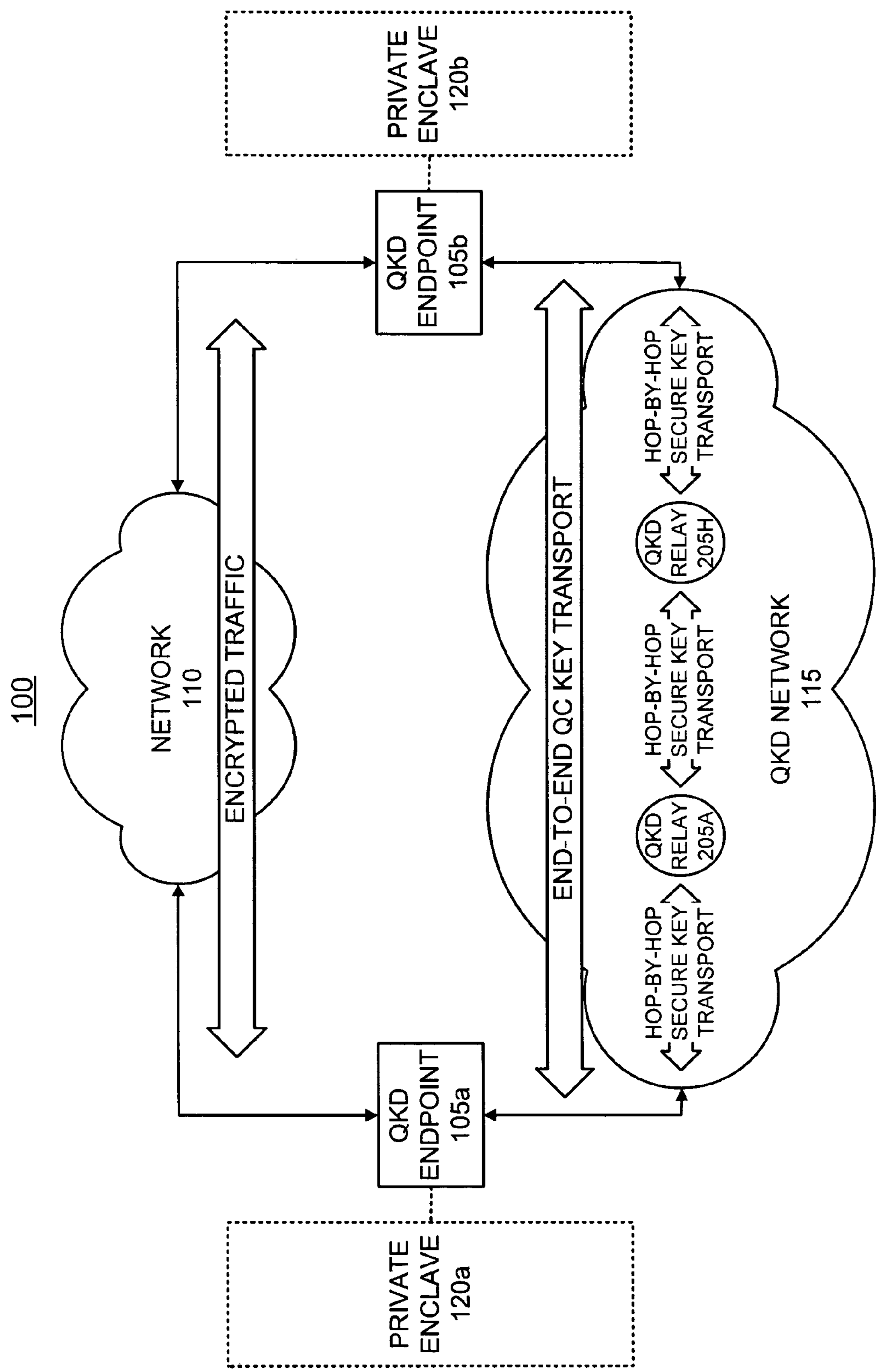
FIG. 1 illustrates an exemplary network in which systems and methods, consistent with the present invention, may be implemented.

FIG. 1 illustrates an exemplary network 100 in which systems and methods for distributing encryption keys via quantum cryptographic mechanisms, consistent with the present invention, may be implemented. Network 100 may include QKD endpoints 105*a* and 105*b* connected via sub-network 110 and QKD sub-network 115. Two QKD endpoints 105*a* and 105*b* are shown by way of example only. Network 100 may include multiple QKD endpoints 105 connected via sub-network 110 and QKD sub-network 115.

QKD endpoints 105*a* and 105*b* may each include a host or a server. QKD endpoints 105*a* and 105*b* that include servers may further connect to private enclaves 120*a* and 120*b*, respectively. Each private enclave 120 may include local area networks (LANs) (not shown) interconnected with one or more hosts (not shown). Sub-network 110 can include one or more circuit-switched or packet-switched networks of any type, including a Public Land Mobile Network (PLMN), Public Switched Telephone Network (PSTN), LAN, metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

QKD sub-network 115 may include one or more QKD relays (QKD relays 205A and 205H shown for illustrative purposes only) for transporting end-to-end secret keys between a source QKD endpoint (e.g., QKD endpoint 105*a*) and a destination QKD endpoint (e.g., QKD endpoint 105*b*). The QKD relays of QKD sub-network 115 may include trusted relays. Trusted QKD relays may include QKD relays that consist of a known or assumed level of security.

Consistent with the present invention, each QKD relay 205 and QKD endpoint 105 of sub-network 115 may exchange secret key bits, via QKD techniques, with each of its neighboring QKD relays. For example, as shown in FIG. 1, QKD endpoint 105*a*, QKD relay 205A, QKD relay 205H, and QKD endpoint 105*b* may exchange secret key bits with each "neighbor" that may used for transporting end-to-end keys between the neighboring nodes. For example, QKD endpoint 105*a* and QKD relay 205A may exchange a first set of secret key bits for transporting an end-to-end key. QKD relay 205A and QKD relay 205H may exchange a second set of secret key bits for transporting an end-to-end key. QKD relay 205H and QKD endpoint 105*b* may exchange a third set of secret key bits for transporting an end-to-end key.

Subsequent to key transport via QKD sub-network 115, QKD endpoint 105*a* and QKD endpoint 105*b* may encrypt end-to-end traffic using the transported key(s) and transmit the traffic via sub-network 110.

Figure 2:
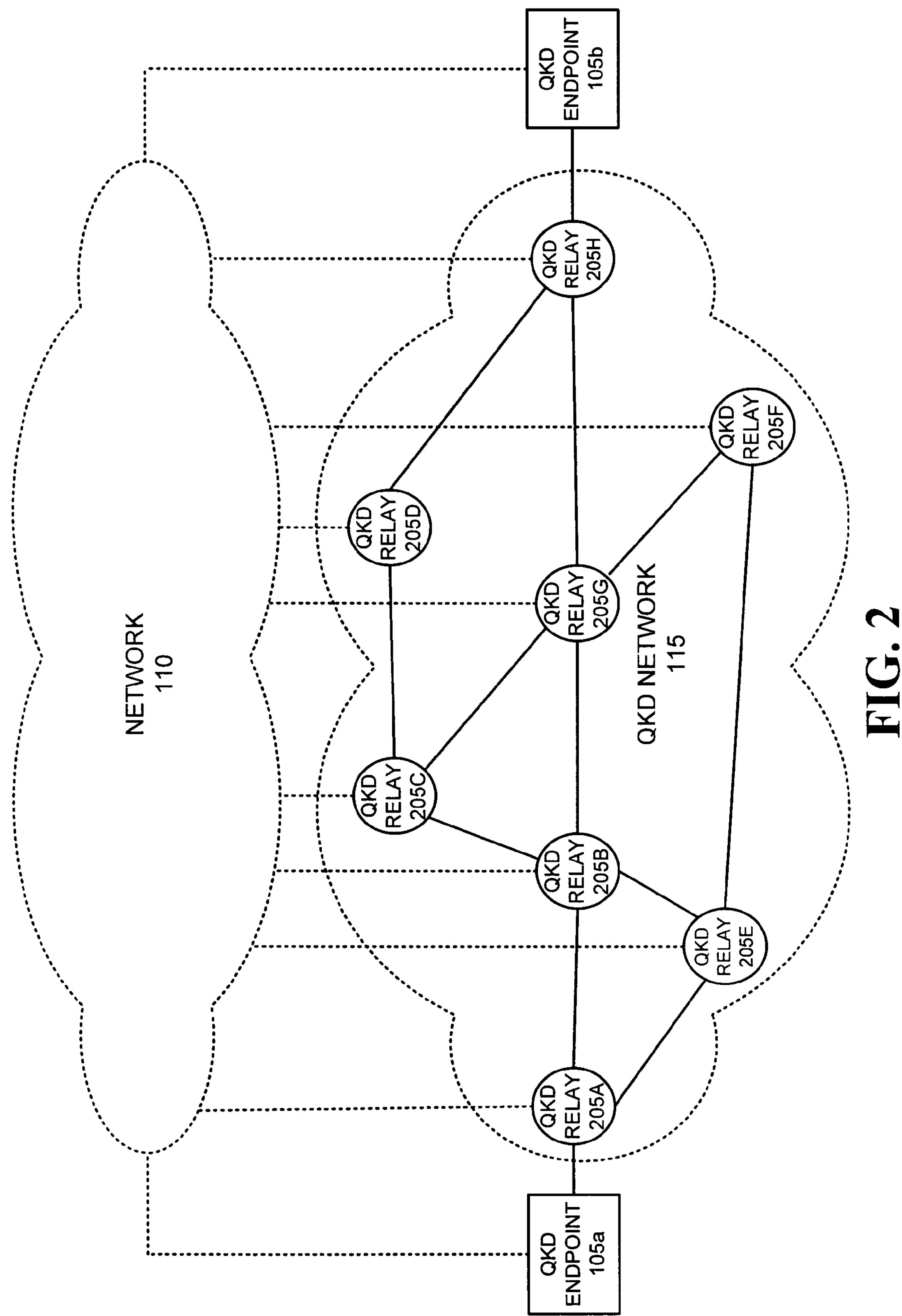
FIG. 2 illustrates exemplary QKD relay nodes of the QKD network of FIG. 1 consistent with the present invention.

FIG. 2 illustrates an exemplary diagram, consistent with the present invention, that depicts QKD relays of QKD sub-network 115. QKD sub-network 115 may include one or more QKD relays 205A-205H interconnected via one or more links that may carry light throughout the electromagnetic spectrum, including light in the human-visible spectrum and light beyond the human-visible spectrum, such as, for example, infrared or ultraviolet light. The interconnecting links may include, for example, conventional optical fibers. Alternatively, the interconnecting links may include free-space optical paths, such as, for example, through the atmosphere or outer space (e.g., free-space to terrestrial, aircraft or satellite nodes), or even through water or other transparent media. As another alternative, the interconnecting links may include hollow optical fibers that may be lined with photonic band-gap material. A given network may consist of a mixture of such differing types of links, e.g., some links being free space, other being through optical fiber, and others being based on entanglement. As shown in FIG. 2, QKD endpoints 105*a* and 105*b* may each connect with one or more QKD relays of QKD sub-network 115. The configuration of the relays of QKD sub-network 115, and the interconnection of QKD endpoint 105*a* and 105*b*, as shown in FIG. 2, is for illustrative purposes only. More, or fewer, QKD relays 205 may exist in QKD sub-network 115, with various different links interconnecting the QKD relays 205. Additionally, each QKD endpoint 105 may have QKD links to multiple QKD relays, thus, permitting fully disjoint paths between the endpoints.

Each of the one or more links shown in FIG. 2 may carry optical QKD pulses (i.e., photon pulses) for encoding and transmitting cryptographic keys. The optical QKD pulses may, for example, be polarization or phase modulated to quantum encode the cryptographic key symbol information. Alternatively, entangled photons may be employed. In some implementations, other non-optical pulses that include, for example, individual atoms, electrons, etc., may alternatively be used. In embodiments employing non-optical pulses, the individual quantum particles (e.g., atoms, electrons) may be modulated to quantum encode cryptographic key symbols.

Figure 3:
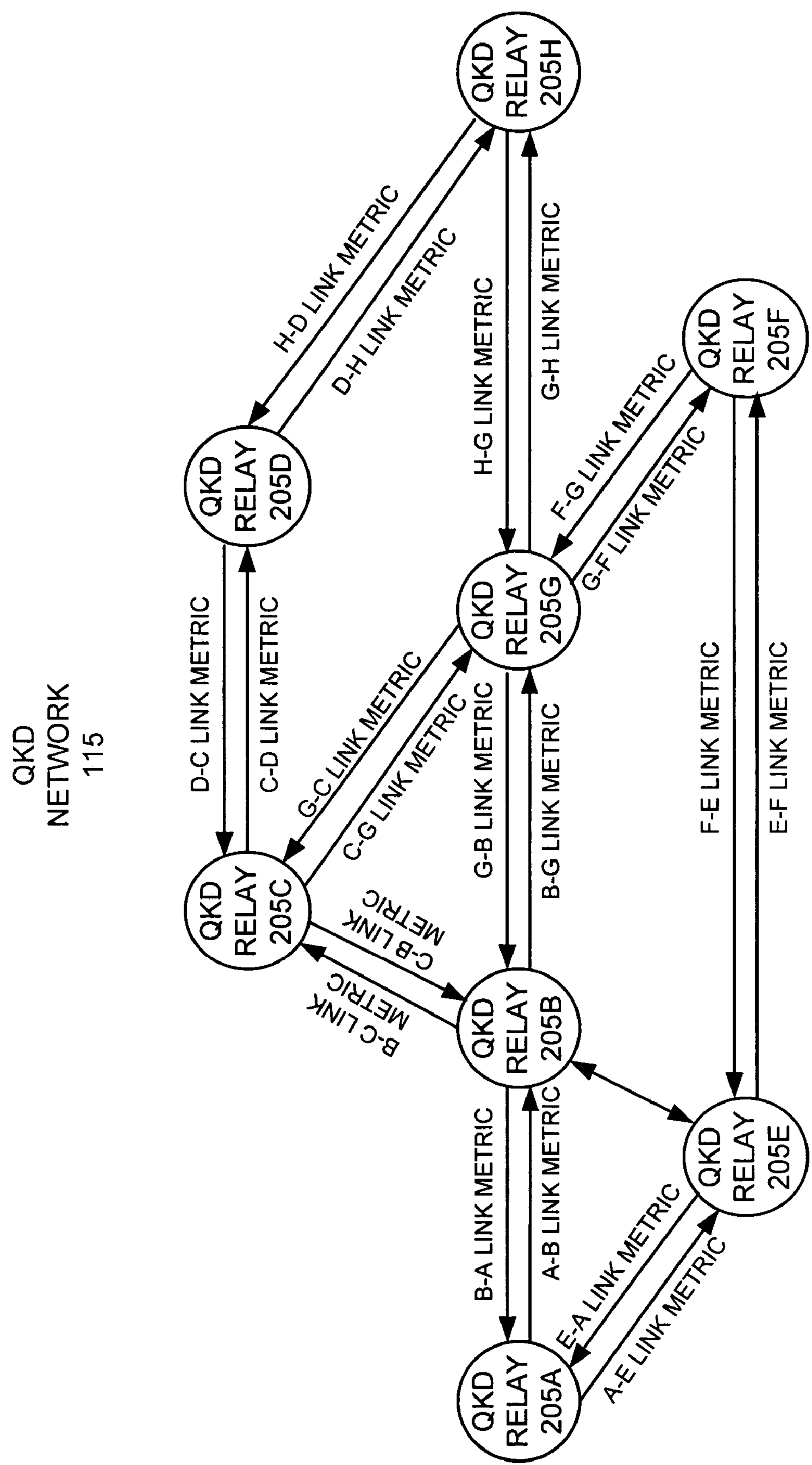
FIG. 3 illustrates exemplary QKD link metrics associated with the links between the QKD relay nodes of FIG. 2 consistent with the present invention.

FIG. 3 illustrates a link metric diagram that depicts one or more metrics associated with each link between each QKD relay 205 of QKD sub-network 115. The one or more metrics associated with each link may be determined in a number ways, including, for example, by a function of a number of secret key bits exchanged between two relays at each end of a respective link. The one or more metrics associated with each link may be determined in other exemplary ways, including, for example, basing a link metric on rates of change in a number of secret bits shared between two relays, a time series average of a number of secret bits shared between two relays, and/or predictions of a number of shared secret bits that will be available at two relays interconnected by a respective link. In one implementation, a metric $M_{link}$ for each link may be determined in accordance with the following:

$$M_{LINK} = 5 + \frac{100}{q+1} \quad \text{Eqn. (1)}$$

where q is associated with a number of shared secret bits for a given link. In some implementations, for example, q may represent a number of blocks of known size of shared secret bits. In other implementations, q may represent just the number of individual shared secret bits for the given link.

Each link of QKD sub-network 115 may have either "simplex" or "duplex" link metrics. A link with a "simplex" link metric may have a single metric for both directions along the link. A link with "duplex" link metrics may have two distinct metrics, one for each direction along the link. For example, FIG. 3 illustrates "duplex" link metrics between each QKD relay 205 of QKD sub-network 115. In FIG. 3, for example, two link metrics (i.e., D-C link metric, C-D link metric) exist between QKD relays 205C and 205D. Similarly, two link metrics (i.e., F-E link metric, E-F link metric) exist between QKD relays 205E and 205F.

Figure 4A:
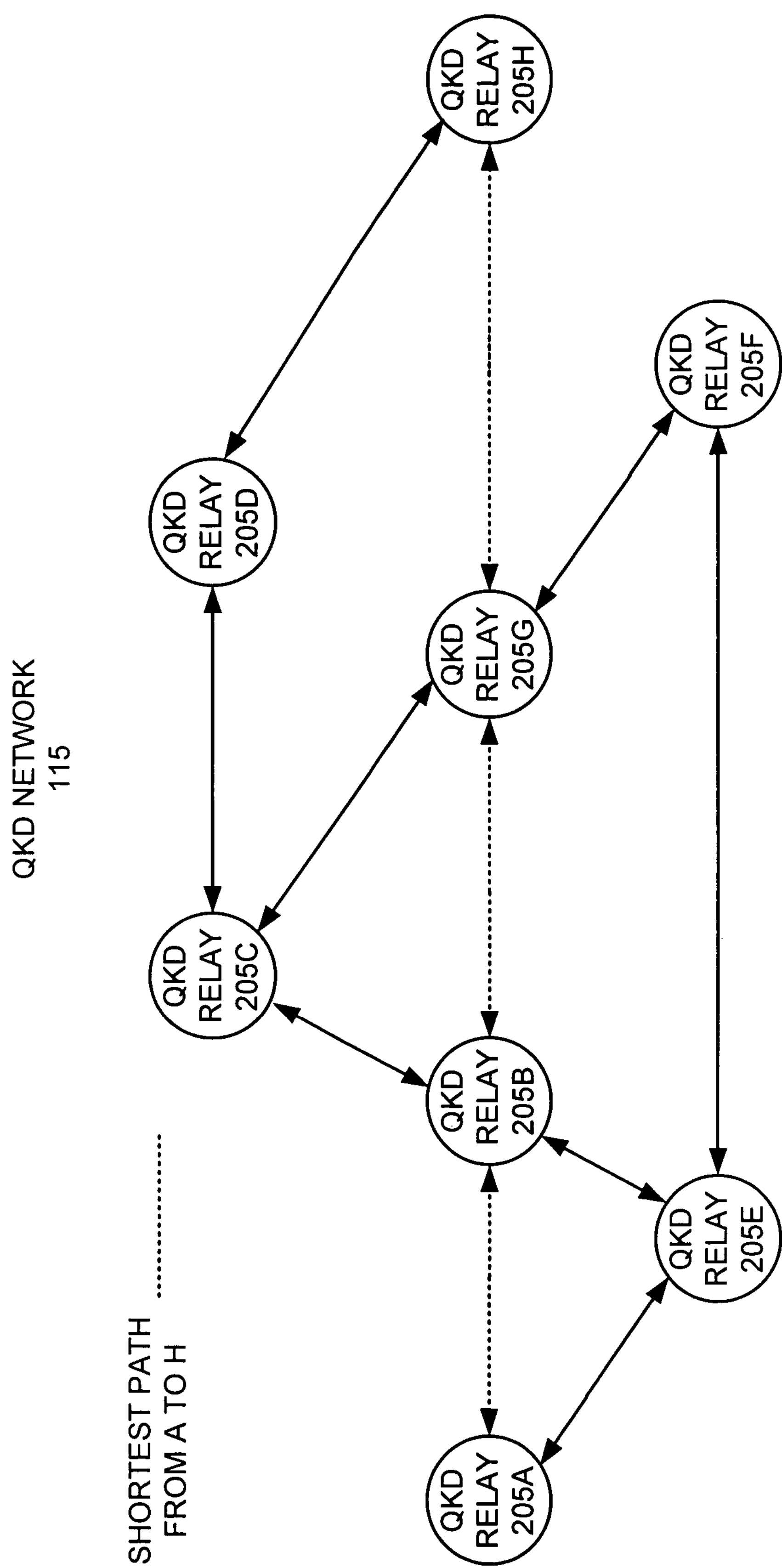
FIG. 4A illustrates an exemplary shortest path for transporting end-to-end secret keys through the QKD network of FIG. 2 consistent with the present invention.

FIG. 4A illustrates one implementation consistent with the invention in which a shortest path through QKD network 115, from QKD relay 205A to QKD relay 205H, is determined for transporting end-to-end secret keys via QKD. Once a node has received link metrics associated with every link between every node in QKD network 115, the node may construct an entire network graph that includes the link metrics for each link in the network. The node may then employ standard algorithms for computing the "best" paths (e.g., least cost) for key transport through QKD network 115. A wide range of conventional algorithms exist for determining a "best" path through QKD network 115. In one implementation, for example, the conventional Shortest Path First (SPF), also known as Dijkstra's algorithm, may be employed. This algorithm allows any node in QKD network 115 to determine a single shortest path from itself to any other node in QKD network 115. For example, this algorithm permits QKD relay 205A to determine the shortest path from itself to QKD relay 205H across QKD network 115. As shown in FIG. 4A, an exemplary "best" path may include the path that includes QKD relay 205A, QKD relay 205B, QKD relay 205G and QKD relay 205H.

Figure 4B:
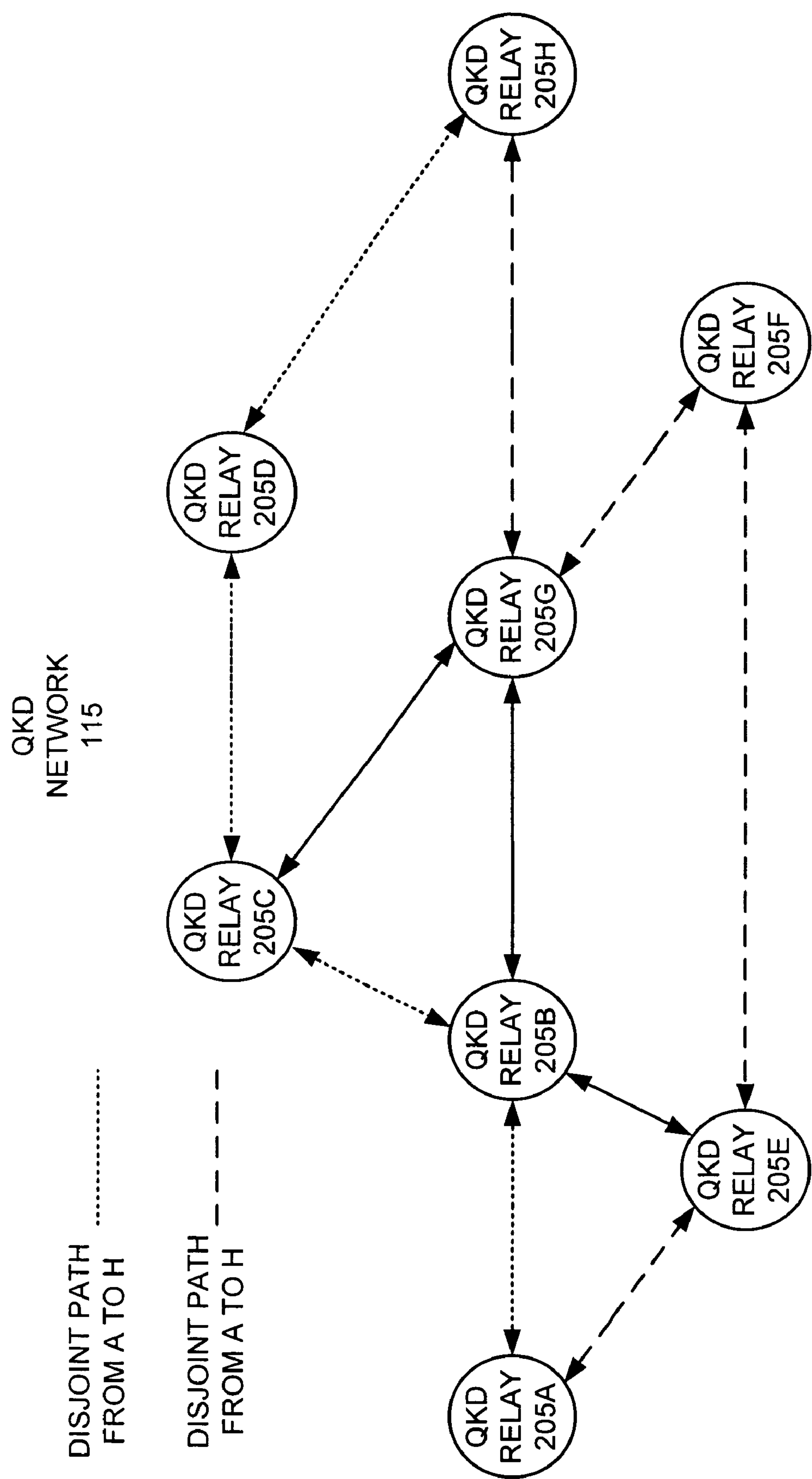
FIG. 4B illustrates exemplary disjoint paths through the QKD for transporting end-to-end secret keys through the QKD of network of FIG. 2 consistent with the present invention.

FIG. 4B illustrates another implementation consistent with the invention in which two or more disjoint, or partially disjoint, paths are determined for transporting end-to-end secret keys via QKD across QKD network 115 (only two disjoint paths are shown in FIG. 4B for illustrative purposes). For example, as shown in FIG. 4B, a first disjoint path may be determined that includes QKD relay 205A, QKD relay 205B, QKD relay 205C, QKD relay 205D and QKD relay 205H. A second disjoint path may be determined that includes QKD relay 205A, QKD relay 205E, QKD relay 205F, QKD relay 205G and QKD relay 205H. A number of conventional algorithms exist for determining two or more disjoint, or partially disjoint, paths through a network.

Exemplary Key Transport

Figure 5A:
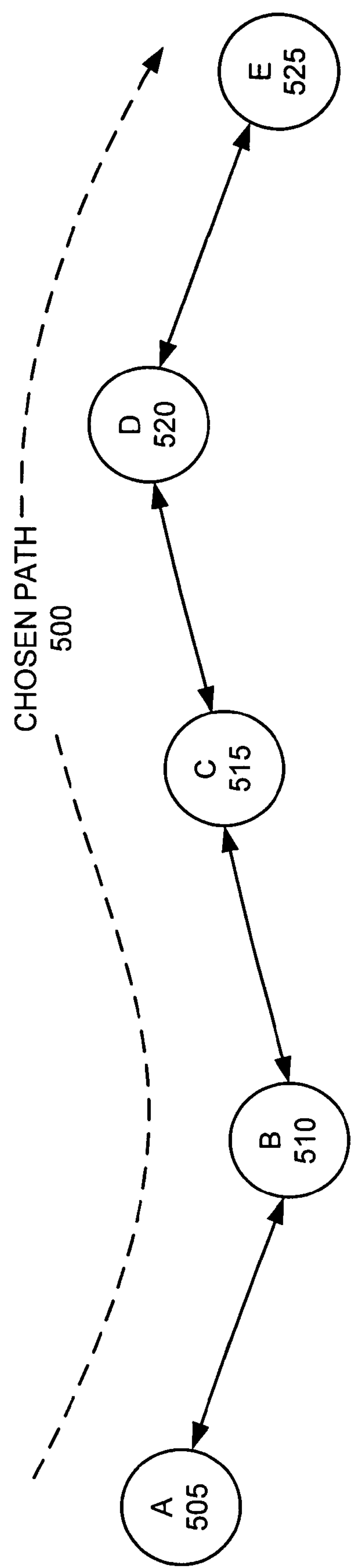
FIG. 5A illustrates an exemplary path chosen for transporting keys through a QKD network.

FIGS. 5A-5D graphically illustrate an exemplary process for transporting keys across QKD sub-network 115 consistent with the invention. The number of nodes (e.g., Nodes A 505, B 510, C 515, D 520 and E 525) shown in FIG. 5A are shown for illustrative purposes only. More or fewer nodes may exist in any selected path across QKD sub-network 115. Furthermore, each of the nodes shown in FIGS. 5A-5D may include a QKD endpoint 105 or a QKD relay 205. Messaging illustrated in FIGS. 5A-5D may occur over a public communications medium, such as, for example, sub-network 110.

As shown in FIG. 5A, a chosen path 500 may already be selected between a source node and a destination (i.e., node A 505 and node E 525 in FIG. 5A) prior to key transport, with the illustrated chosen path 500 including a path from node A 505 to node B 510, node B 510 to node C 515, node C 515 to node D 520, and node D 520 to node E 525. In some implementations, for example, the chosen path 500 may be selected in accordance with the exemplary routing protocols and algorithms disclosed in U.S. patent application Ser. No. 10/799,177, entitled "Systems and Methods for Implementing Routing Protocols and Algorithms for Quantum Cryptographic Key Transport."

Figure 5B:
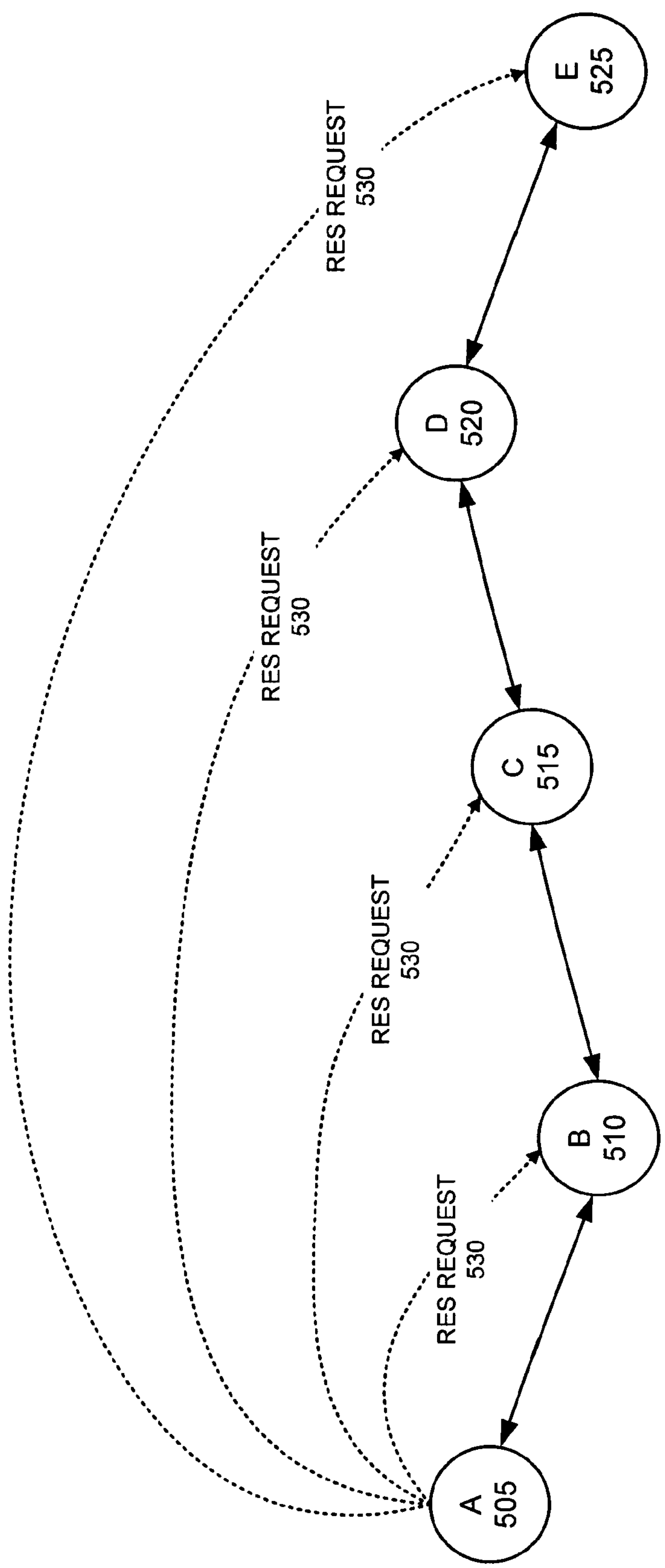
FIG. 5B illustrates an exemplary reservation request process for reserving blocks of secret bits transmitted between each node of the chosen path using quantum cryptographic techniques.
Figure 5C:
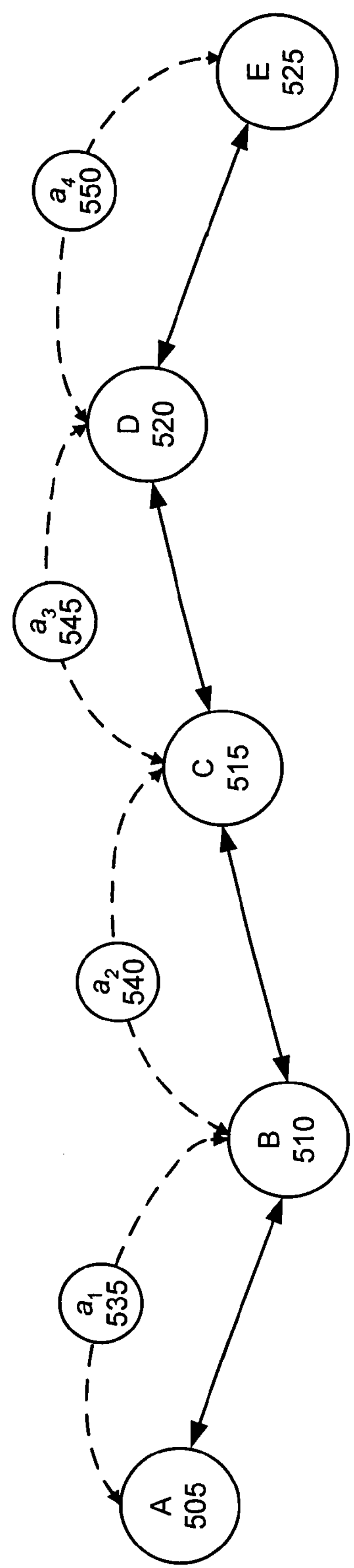
FIG. 5C illustrates exemplary secret block negotiation and selection consistent with the present invention.

As shown in FIG. 5B, node A 505 may initiate key transfer by sending reservation requests 530 to each node along chosen path 500, the reservation requests indicating each node's predecessor along chosen path 500. As further shown in FIG. 5C, each of the nodes along chosen path 500 that receives a reservation request 530 may then negotiate and reserve blocks of shared secret bits with its predecessor along the path (i.e., the "previous hop" node along chosen path 500). Each block of the secret bits shared between each node may have been derived from pair-wise quantum cryptography between neighboring nodes along chosen path 500. For example, node B 510 may reserve a block $a_1$ 535 of shared secret bits 535 with its predecessor node A 505 along chosen path 500, node C 515 may reserve a block $a_2$ 540 of shared secret bits with its predecessor node B 510 along chosen path 500, node D 520 may reserve a block $a_3$ 545 of shared secret bits with its predecessor node C 515 along chosen path 500 and node E 525 may reserve a block $a_4$ 550 of shared secret bits with its predecessor node D 520 along chosen path 500. Each node may inform the source node (i.e., node A 505) when secret bit block reservation is complete.

Figure 5D:
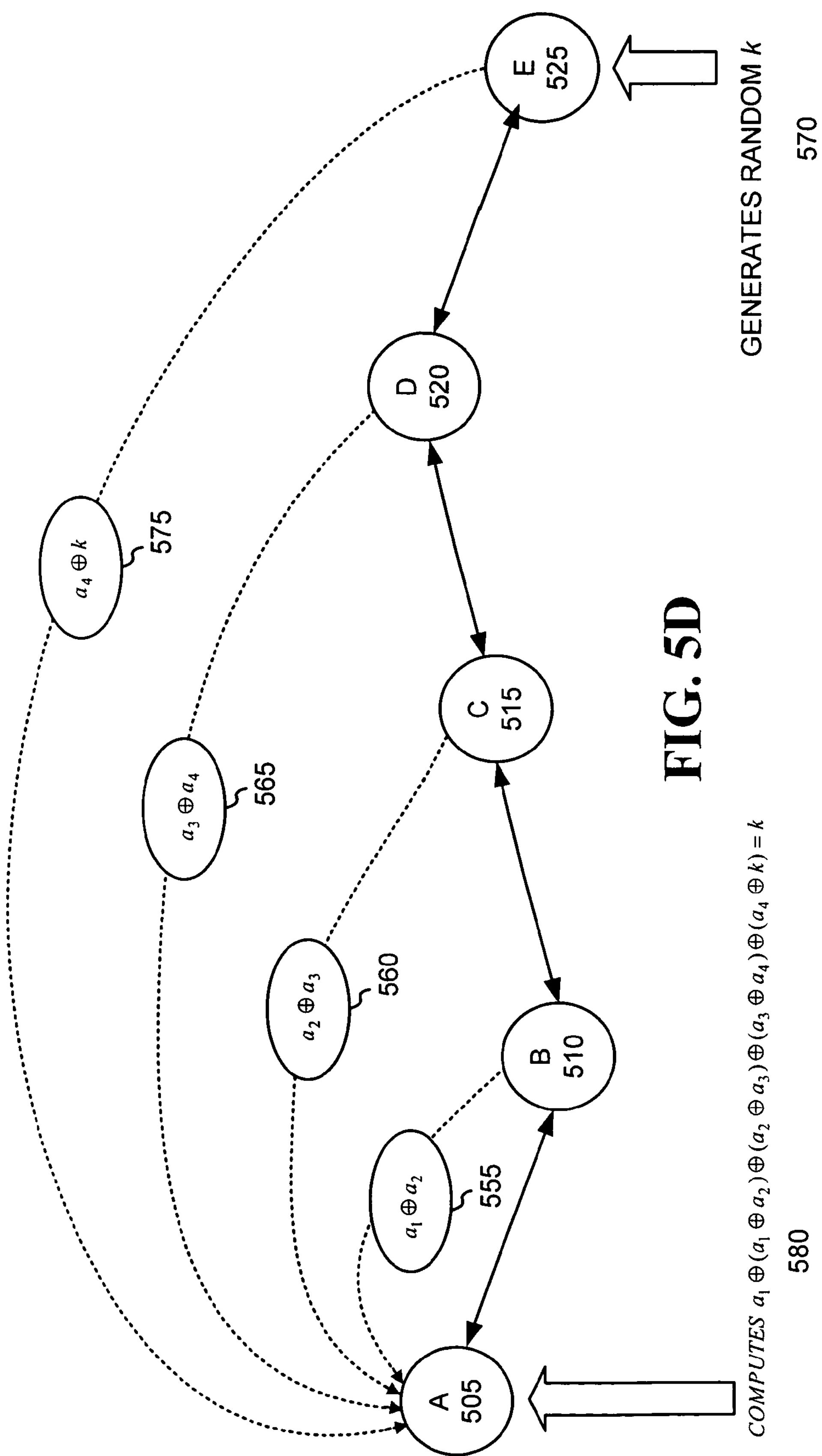
FIG. 5D illustrates exemplary key transport in which a key k can be extracted from blocks of bits sent from nodes along the chosen path.

If all reservations along chosen path 500 were successful, the source node A 505 may request key data from all intermediate nodes and the destination node. The intermediate nodes (i.e., nodes B 510, C 515 and D 520) may then send node A 505 an exclusive OR (XOR) of the blocks of secret bits shared with a previous hop and a next hop from each intermediate node. For example, as shown in FIG. 5D, node B 510 may send a XOR of blocks $a_1$ and $a_2$ to node A 505, node C 515 may send a XOR of blocks $a_2$ and $a_3$ to node A 505, and node D 520 may send a XOR of blocks $a_3$ and $a_4$ to node A 505. The destination node along chosen path 500 (i.e., node E 525) may generate a random block of bits k, using, for example, conventional random number generation algorithms, as the final key to be used for encrypting traffic between source node A 505 and destination node E 525. Node E 525 may then send a XOR of block $a_4$ and random block of bits k to node A 505. Node A may determine the original random block of bits k using the following:

$$k=a_1\oplus(a_1\oplus a_2)\oplus(a_2\oplus a_3)\oplus(a_3\oplus a_4)\oplus(a_4\oplus k) \quad \text{Eqn.(1)}$$

The random block of bits k, determined in accordance with Eqn. (1), may be used subsequently for encrypting/decrypting data sent between source node A 505 and destination node E 525 via, for example, network 110.

FIGS. 5A-5D illustrate key transport via a single path in QKD sub-network 115. However, in some implementations, in order to make QKD sub-network 115 less vulnerable to the compromising of a single node, key transport protocols consistent with the invention may utilize multiple, independent paths. In such implementations, the source node may send reservation requests along all of the multiple, independent paths, and the destination node may send back the random block k XORed with all the previous-hop blocks of secret bits. The source node may then XOR this with all the data received from the intermediate nodes and all the first-hop blocks of secret bits. In this way, every block of secret bits, except the one randomly generated by the destination node, may be XORed twice, so that the result at the source node may be the new random block k generated by the destination. As before, the resulting block of bits shared by the source and destination nodes may be the randomly generated block k. An adversary, thus, should not be able to deduce the contents of block k without compromising either the source node, the destination node, or one intermediate node from each of the independent paths.

In another implementation of the invention (not shown in FIG. 5B-5D), each node (e.g., B 510, C 515 and D 520) in a path between nodes A 505 and E 525 (shown in FIG. 5A) may recover a random block of data k generated at node A 505 and exclusive OR the block k with a pairwise key exchanged with its preceding neighbor along the path to pass the block of data k (i.e., the secret key) along the path between nodes A 505 and B 510. In such an implementation, each adjacent pair of neighbors (i.e., node A 505 and node B 510, node B 510 and node C 515, node C 515 and node D 520, etc.) may agree upon a block of shared secret bits (i.e., node A 505 and node B 510 agree upon block AB, node B 510 and node C 515 agree upon block BC, node C 515 and node D 520 agree upon block CD, etc.). Node A 510 may then generate a random block of data k. Node A 510 may exclusively OR block k with the agreed upon block of secret bits AB and then send the results to node B 510. Node B 510 may recover data block k by exclusively ORing the results received from Node A 510 with the agreed upon block of secret bits AB.

B may then exclusively OR data block k with the agreed upon block of secret bits BC and then send the results to node C 515. Node C 515 may recover data block k by exclusively ORing the results received from Node B 510 with the agreed upon block of secret bits BC. Node C 515 may exclusively OR data block k with the agreed upon block of secret bits CD and send the results to node D 520. Node D 520 may recover data block k by exclusively ORing the results received from Node C 515 with the agreed upon block of secret bits CD. Node D 520 may exclusively OR data block k with the agreed upon block of secret bits DE and send the results to node E 525. Lastly, node E may recover data block k (i.e., the secret key) by exclusively ORing the results received from Node D 520 with the agreed upon block of secret bits DE. Nodes A 505 and E 525 may, for example, then use the exchanged data block k as a secret key for sending data between them via sub-network 110.

In yet another implementation of the invention, either the source node (e.g., node A 505 in FIG. 5A), destination node (e.g., node E 525 in FIG. 5A), both the source or destination nodes, or neither nodes, may produce a random block of data $k_x$ for use in the key transport process. If both the source node and the destination node produce a random block of data $k_A$ and $k_B$, then the blocks of data $k_A$ and $k_B$ may be logically combined (e.g., XOR'd) to produce the key used by both nodes. In the case that neither nodes produces a random block of data, the key used may be the same as the first-hop or last-hop key.

Exemplary QKD Relay

Figure 6A:
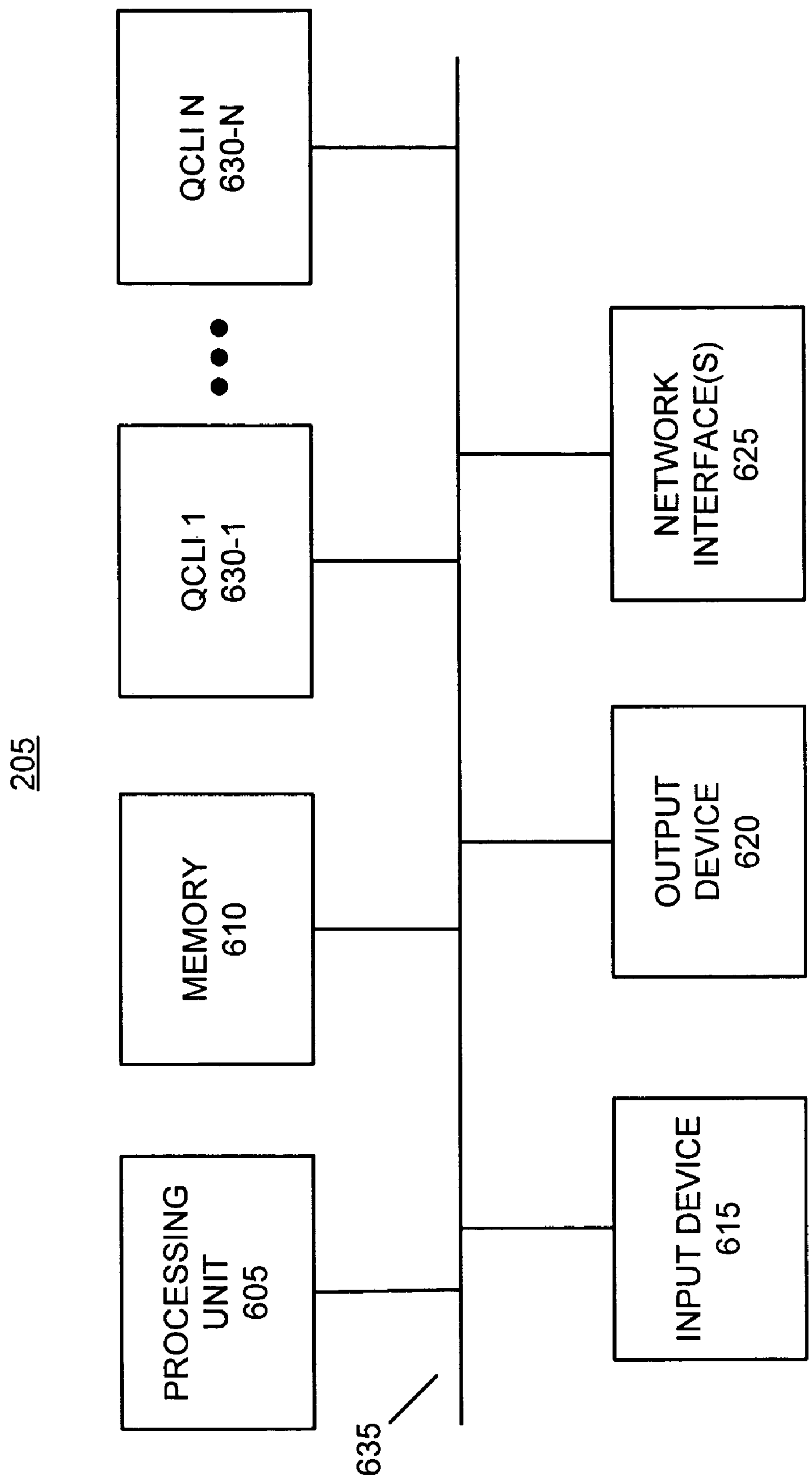
FIG. 6A illustrates an exemplary configuration of a QKD relay consistent with the present invention.

FIG. 6A illustrates components of an exemplary QKD relay 205 in which quantum cryptographic techniques can be implemented. QKD endpoints 105*a* and 105*b* may be similarly configured. QKD relay 205 may include a processing unit 605, a memory 610, an input device 615, an output device 620, one or more network interfaces 625, one or more quantum cryptographic link interfaces (QCLI 1 630-1 through QCLI-N 630-N) and a bus 635.

Processing unit 605 may perform all data processing functions for inputting, outputting, and processing of data. Memory 610 may include Random Access Memory (RAM) that provides temporary working storage of data and instructions for use by processing unit 605 in performing processing functions. Memory 610 may additionally include Read Only Memory (ROM) that provides permanent or semi-permanent storage of data and instructions for use by processing unit 505. Memory 610 can include large-capacity storage devices, such as a magnetic and/or optical recording medium and its corresponding drive.

Input device 615 permits entry of data into QKD relay 205 and includes a user interface (not shown). Output device 620 permits the output of data in video, audio, and/or hard copy format. Network interface(s) 625 interconnect QKD relay 205 with sub-network 110 via links unprotected by quantum cryptographic techniques. QCLI 630-1 through QCLI 630-N interconnect QKD relay 205 with QKD sub-network 115 via links protected by quantum cryptographic techniques. Bus 635 interconnects the various components of QKD relay 205 to permit the components to communicate with one another.

Exemplary Quantum Cryptographic Link Interface

Figure 6B:
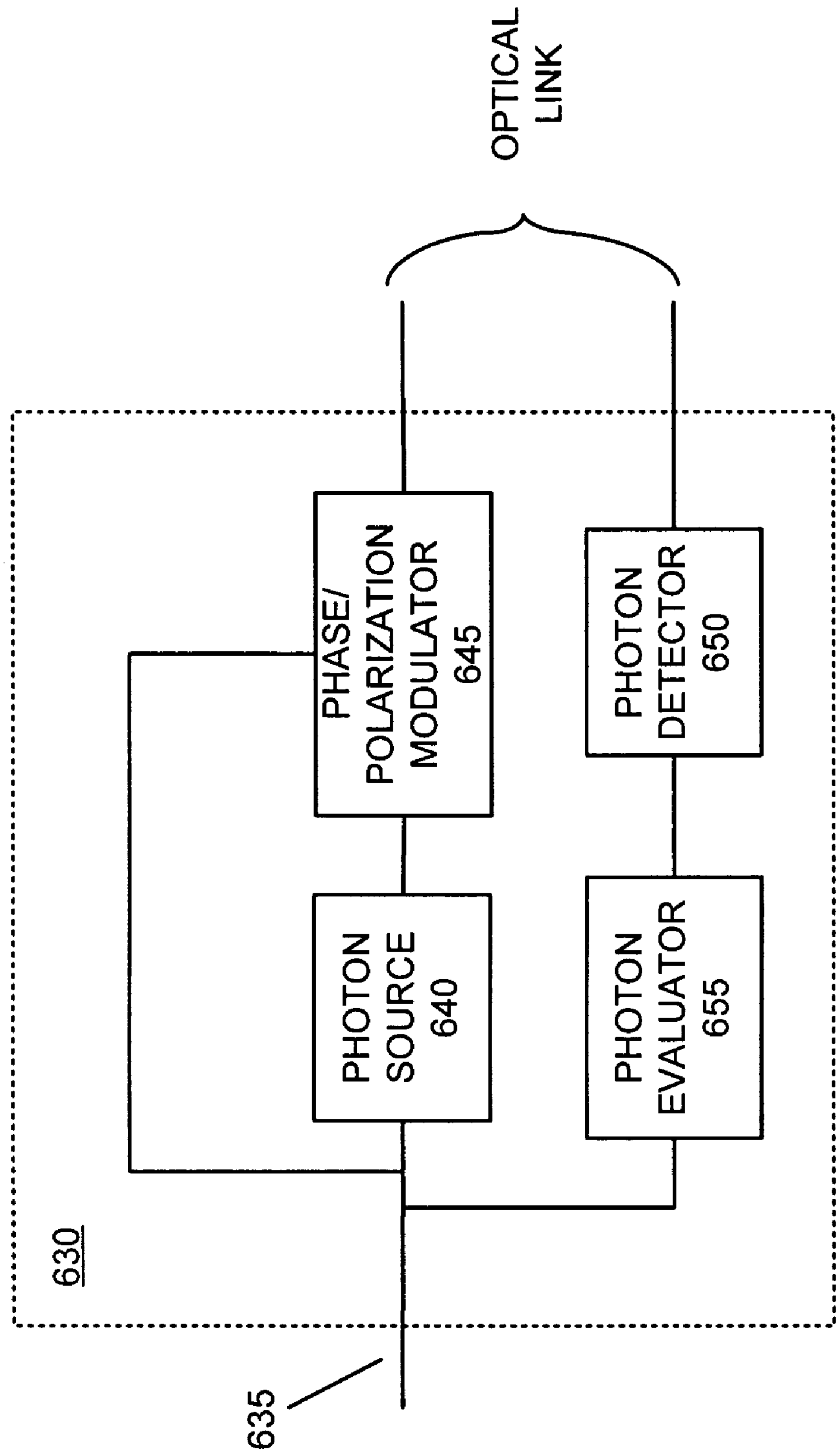
FIG. 6B illustrates an exemplary configuration of a quantum cryptographic link interface of the QKD relay of FIG. 5A consistent with the present invention.

FIG. 6B is a diagram illustrating exemplary components of a quantum cryptographic link interface QCLI 630. Other QCLI's in a QKD relay 205 may be configured similarly to QCLI 530 shown in FIG. 6B. QCLI 630 may include a photon source 640, a phase/polarization modulator 645, a photon detector 650, a photon evaluator 655, and a bus 635.

Photon source 640 may include, for example, a conventional semiconductor laser. Photon source 640 produces photon signals according to instructions provided by processing unit 605. Phase/polarization modulator 645 may include, for example, conventional semiconductor phase modulators or conventional liquid crystal polarization modulators. Phase/polarization modulator 645 may encode outgoing photon signals from photon source 640 according to commands received from processing unit 605 for transmission across an optical link.

Photon detector 650 can include, for example, conventional avalanche photo diodes (APDs) or conventional photomultiplier tubes (PMTs). Photon detector 650 may detect photon signals received across an optical link from other QCLI's in QKD sub-network 115.

Photon evaluator 655 can include conventional circuitry for processing and evaluating output signals from photon detector 650 in accordance with conventional quantum cryptographic techniques.

Exemplary QKD Neighbor Database

Figure 7:
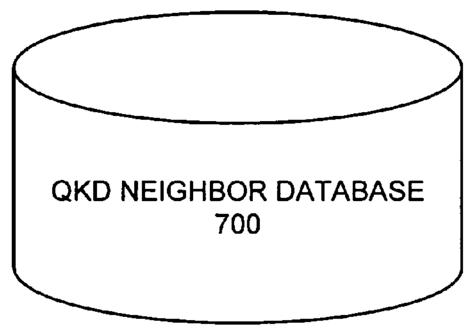
FIG. 7 illustrates an exemplary QKD neighbor database associated with the QKD relay of FIG. 5A consistent with the present invention.
Figure 8:
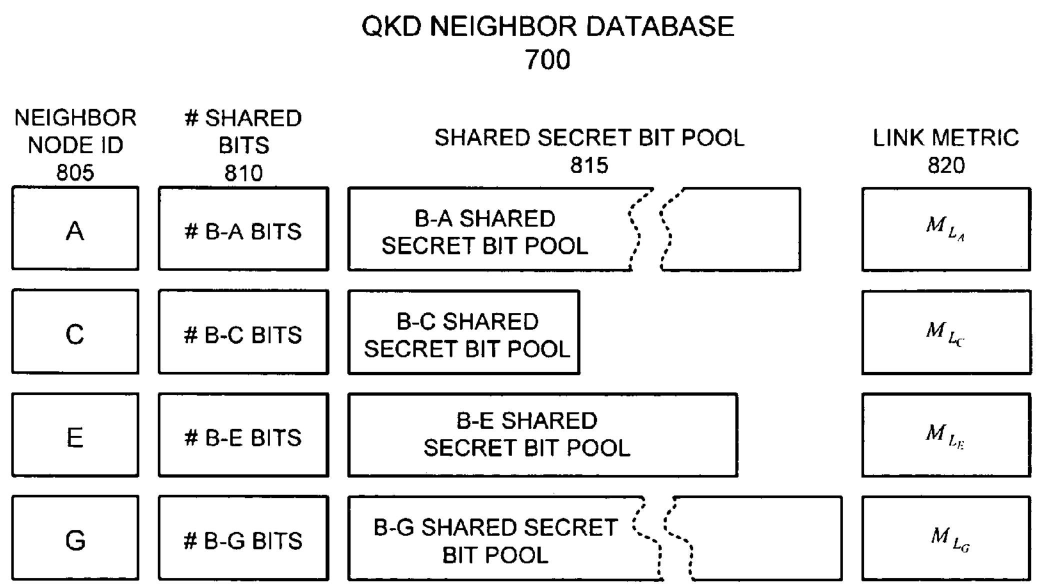
FIG. 8 illustrates an exemplary configuration of the QKD neighbor database of FIG. 6 consistent with the present invention.

FIG. 7 illustrates an exemplary QKD neighbor database 700 that may be associated with a QKD relay 205 consistent with the present invention. Database 700 may be stored in memory 610 of QKD relay 205, or may be located externally to QKD relay 205. As shown in FIG. 8, QKD neighbor database 700 may include multiple entries, such as, for example, one entry for each neighboring node. By way of example, FIG. 8 illustrates an exemplary database 700 associated with QKD relay 205B of QKD network 115. A different QKD neighbor database 700 may, though, be associated with each QKD relay 205 of QKD sub-network 115.

Each entry of QKD neighbor database 700 may include a neighbor node identifier 805, a number of shared bits value 810, a shared secret bit pool 815 and a link metric 820. Neighbor node identifier 805 may uniquely identify a neighboring node. In some implementations, for example, identifier 805 may include a network address of the neighboring node. In the example of FIG. 8, database 700 includes entries for each of QKD relays 205A, 205C, 205E and 205G. The number of shared bits value 810 indicates the exact number of secret bits shared with the node identified by node identifier 805 via QKD. For example, the number of shared bits value 810 for QKD relay 205A may include the number of bits shared between QKD relay 205B and 205A. Shared secret bit pool 815 may contain one or more blocks of secret bits (i.e., one or more "Qblocks") shared with the node identified by node identifier 805 via QKD. Link metric 820 may include a metric value associated with a "length" or "cost" of a link identified by the corresponding neighbor node ID 805. For example, as shown in FIG. 8, a link metric of $M_{L_A}$ may be associated with the link between QKD relay 205B and QKD relay 205A identified by neighbor node ID 805.

Exemplary Data Unit

Figure 9B:
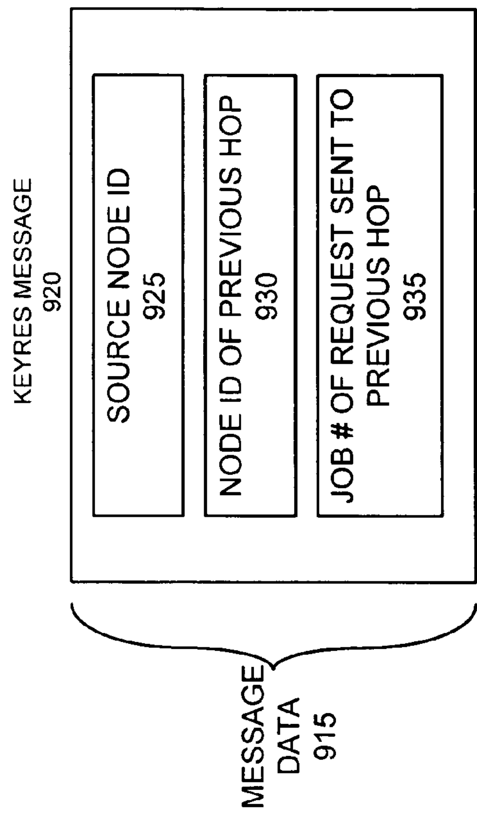
Figure 9C:
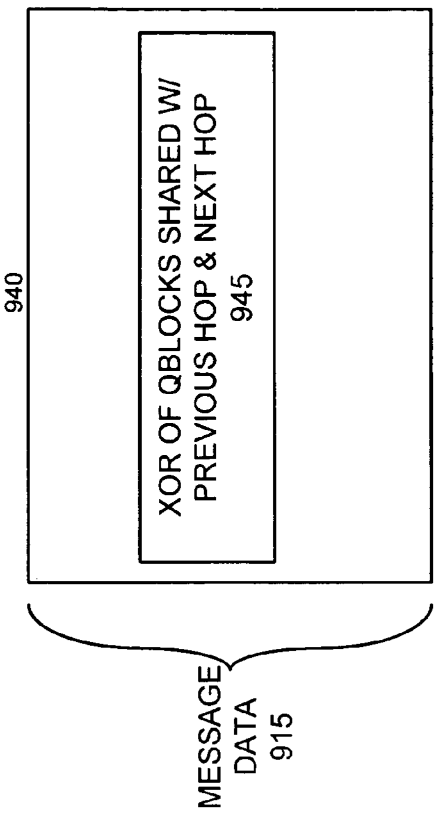
Figure 9A:
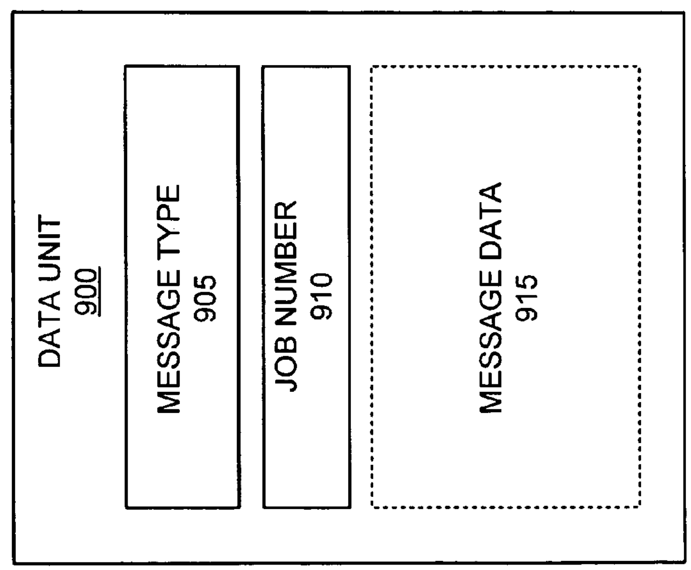

FIG. 9A illustrates an exemplary data unit 900 that may be used by nodes of sub-network 115 for facilitating key transport consistent with the invention. Data unit 900 may include, for example, a packet, a datagram, a cell, a series of signaling pulses, a fragment of a packet, a datagram, or a cell, or other types of data. Data unit 900 may include a message type 905, a job number 910, and optional message data 915. Message type 905 may identify the type of message data 915 contained in data unit 900. Message type 905 may identify, for example, a KEYRES message, a KEYRESD message, a KEYGET message, a KEYCREATE message, a KEYDATA message, a KEYNEG message, a KEYNEGR message, and a KEYACCEPT message.

A KEYRES message may be sent by a source node to each intermediate and destination node along a key transport path to request the receiving node to choose a Qblock with a previous hop on the path and to reserve the chosen Qblock. A KEYRESD message may be sent by an intermediate or destination node in reply to a KEYRES message and may indicate that a Qblock has been successfully chosen and that a reservation is complete. A KEYGET message may be sent by a source node to each intermediate node, when all reservations are complete, to fetch XORed Qblock values. A KEYCREATE message may be sent by a source node to a destination node when all reservations are complete, to fetch the newly-created Qblock k XORed with the previous hop Qblock. A KEYDATA message may be sent by a destination node or an intermediate node in reply to a KEYGET or a KEYCREATE message and may contain an XOR of Qblocks shared with a previous hop and a next hop (or, for the destination node, the newly-created random Qblock k).

A KEYNEG message may start a Qblock negotiation process and may be sent by a node along the path to the previous hop to propose a Qblock, or set of Qblocks, to reserve. The proposed Qblocks may all be reserved by the sender of the KEYNEG message, and the receiver may either accept one of the proposed Qblocks, or respond with a KEYNEGR message to propose a different set. A KEYNEGR message may continue the Qblock negotiation process if none of the Qblocks proposed in a received KEYNEG message are available. The new set of Qblocks proposed in the KEYNEGR message may be older than any Qblocks proposed before (i.e., the negotiation may work backwards from newest to oldest before giving up). A receiver of the KEYNEGR message may release any Qblocks currently held under the same job number, and either accept one of the proposed Qblocks, or respond with another KEYNEGR message. A KEYACCEPT message may be sent from a node to another node accepting one of the Qblocks proposed by the other node in a KEYNEG message.

Job number 910 may indicate an identifier for the key transport interaction "job" being processed in message data 915. Message data 915 may include specific data that corresponds to the message type identified in message type 905. FIGS. 9B-9G below illustrate some examples of the contents of message data 915 corresponding to different message types.

FIG. 9B illustrates exemplary message data 915 of a KEYRES message 920 consistent with the invention. KEYRES message 920 may include a source node identifier 925, a node identifier of a previous hop 930 and a job number of a request sent to the previous hop 935. Source node identifier 925 uniquely identifies the node that was the source of the KEYRES message. In some implementations, for example, source node identifier 925 may include a network address. Node identifier of a previous hop 930 may include an identifier that uniquely identifies a node that is one hop towards the node identified by source node identifier 925 along a path through QKD sub-network 115. Job number of a request sent to a previous hop 935 may include the job number that was assigned to the KEYRES message that was sent by the source node identified by identifier 925 to the node identified by previous hop identifier 930.

FIG. 9C illustrates exemplary message data 915 of a KEYDATA message 940 consistent with the invention. KEYDATA message 940 may include an XOR 945 of Qblocks shared with a previous hop and a next hop from the node originating the KEYDATA message. For example, as shown in FIG. 5D, XOR 945 may include the XOR of the Qblocks $a_2$ and $a_3$ shared between Node C 515 and nodes B 510 and D 520, respectively.

FIG. 9D illustrates exemplary message data 915 of a KEYCREATE message 950 consistent with the invention. KEYCREATE message 950 may include a number 955 that is to be assigned to a key k and, optionally, job numbers of reservations for other paths 960 through QKD sub-network 115 when multiple disjoint paths are employed for key transport. Number 955 that is to be assigned to a key k may be used by a node that receives the KEYCREATE message for identifying a key generated at that node.

FIG. 9E illustrates exemplary message data 915 of a KEYNEG message 965 consistent with the invention. KEYNEG message 965 may include a source node identifier 970, a job number 975 and a list of proposed Qblocks 980. Source identifier 970 may identify the source node that initiated the reservation process. Job number 975 may include the job number 910 that was included in a previously received KEYRES message. List of proposed Qblocks 980 may include a list of identifiers identifying each Qblock of multiple Qblocks that are proposed to be reserved by the node sending the KEYNEG message.

FIG. 9F illustrates exemplary message data 915 of a KEYNEGR message 985 consistent with the invention. KEYNEGR message 985 may include a list of proposed Qblocks 990. List of proposed Qblocks 990 may include a list of identifiers identifying each Qblock of multiple Qblocks that are proposed to be reserved by the node sending the KEYNEGR message.

FIG. 9G illustrates exemplary message data 915 of a KEYACCEPT message 995 consistent with the invention. KEYACCEPT message 995 may include a Qblock number 997 that corresponds to an identifier of a selected Qblock of the multiple Qblocks listed in the list of proposed Qblocks 980 or 990 in a KEYNEG or KEYNEGR message, respectively.

Exemplary Simplified Path Key Transport

Figure 10:
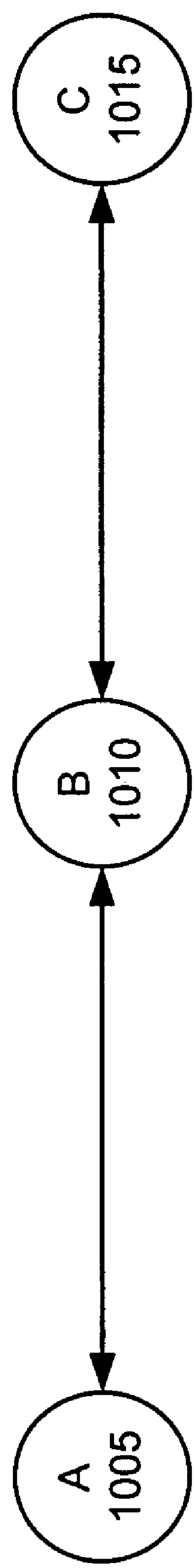
FIG. 10 illustrates an exemplary simple path for transporting a key between a destination node and a source node in a QKD network.
Figure 11:
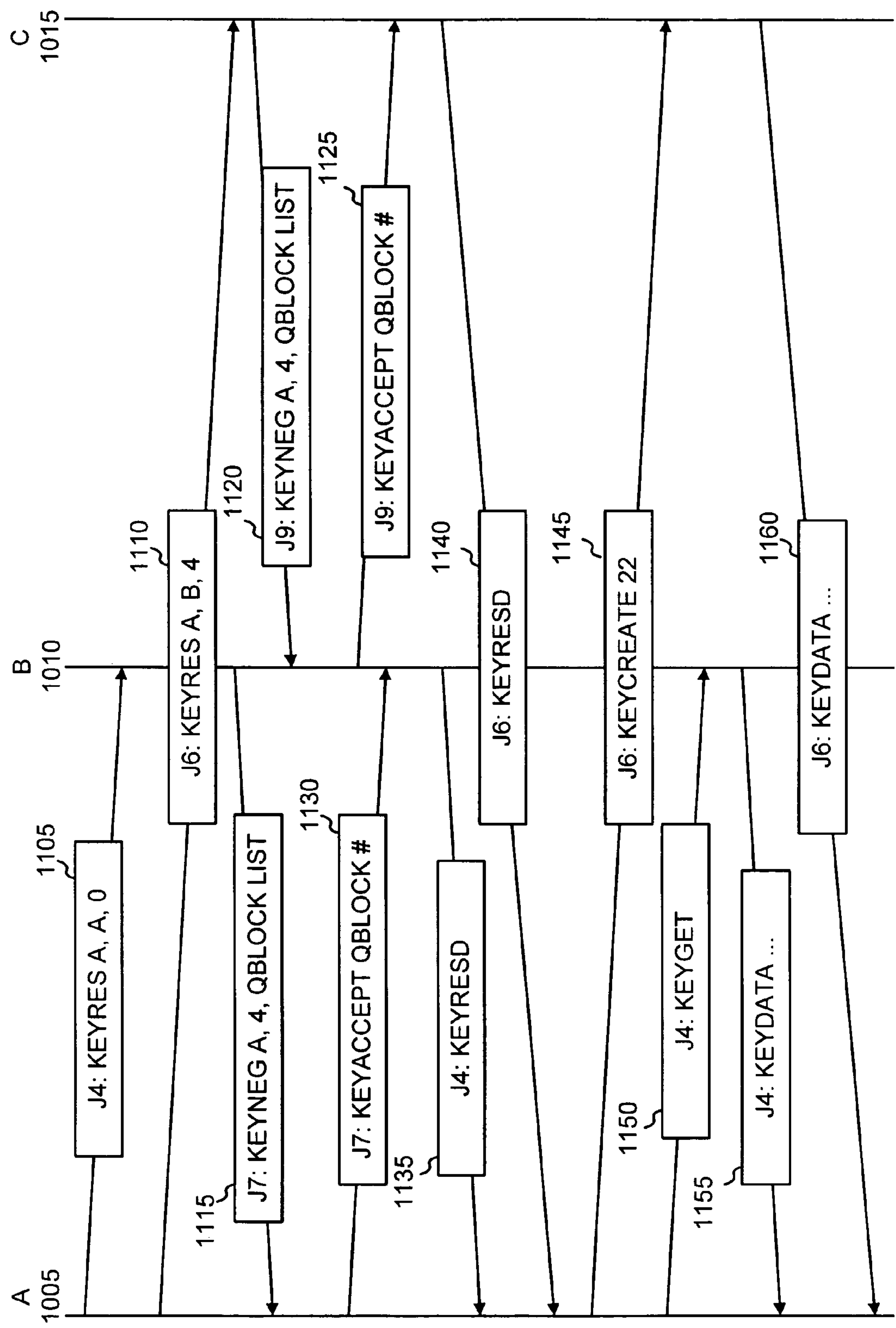
FIG. 11 illustrates exemplary messaging from transporting a key across the simple path shown in FIG. 10.

FIGS. 10 and 11 illustrate exemplary key transport across a simplified path that includes three nodes A 1005, B 1010 and C 1015. The simplified path shown in FIG. 10 is for illustrative purposes only. A path through QKD sub-network 115 may include more or fewer nodes than shown in FIG. 10. Nodes A 1005 and C 1015 may share a key for encrypting and decrypting traffic between them using key transport through intermediate node B 1010.

As shown in FIG. 11, node A 1005 may initiate key transport to node C 1015 through node B 1010 by sending a KEYRES message 1105 to node B 1010 and another KEYRES message 1110 to node C 1015. In this example, KEYRES message 1105 indicates a job number of 4, a source node identifier that identifies node A 1005 as the source of the message, a node identifier that identifies node A 1005 as the previous hop (the same as the source identifier since node A is the first hop on the path), and a job number of 0 for a reservation request sent to a previous hop (i.e., node A is first hop on the path, therefore, there is no previous hop). KEYRES message 1110 indicates a job number of 6, a source node identifier that identifies node A 1005 as the source of the message, a node identifier that identifies node B 1010 as the previous hop in the path, and a job number of 4 for the reservation request sent to the previous hop node B 1010. Node B 1010 may respond with a KEYNEG message 1115 that includes a job number of 7, a source node identifier that identifies node A 1005 as the source of the reservation process, a job number corresponding to the job number used by the source (e.g., node A 1005), and a list of Qblock numbers.

Node A 1005 may respond with a KEYACCEPT message 1130 that includes the job number 7 and a number of the Qblock accepted by node A 1005. Node B 1010 may respond with a KEYRESD message 1135 that includes the job number 4 and indicates that the reservation process is complete with respect to node B 1010.

In response to KEYRES message 1110, node C 1015 may reply with a KEYNEG message 1120. KEYNEG message 1120 may include a job number of 9, a source node identifier that identifies node A 1005 as the source of the reservation process, a job number corresponding to the job number used by the source (e.g., node A 1005), and a list of Qblock numbers. Node B 1010 may respond with a KEYACCEPT message 1125 that includes the job number 9 and a number of the Qblock accepted by node B 1010. Node C 1015 may return a KEYRESD message 1140 that includes the job number 6 and indicates that the reservation process is complete with respect to node C 1015.

Once the reservation process is complete with respect to both nodes B 1010 and C 1015, node A 1005 may send a KEYCREATE message 1145 to node C 1015. KEYCREATE message 1145 may include the number 22 that node C 1015 may use to assign to a generated random key. Node A 1005 may also send a KEYGET message 1150 to node B 1010 that includes the job number 4. Node B 1010 may reply with a KEYDATA message 1155 that includes, for example, XORed Qblock data. Node C 1015 may reply with a KEYDATA message 1160 that includes, for example, reserved Qblock data XORed with the generated random key. Node C 1015 may subsequently extract the random key generated by node C 1015 using, for example, Eqn. (1) above.

Exemplary Source Node Key Transport Process

Figure 12:
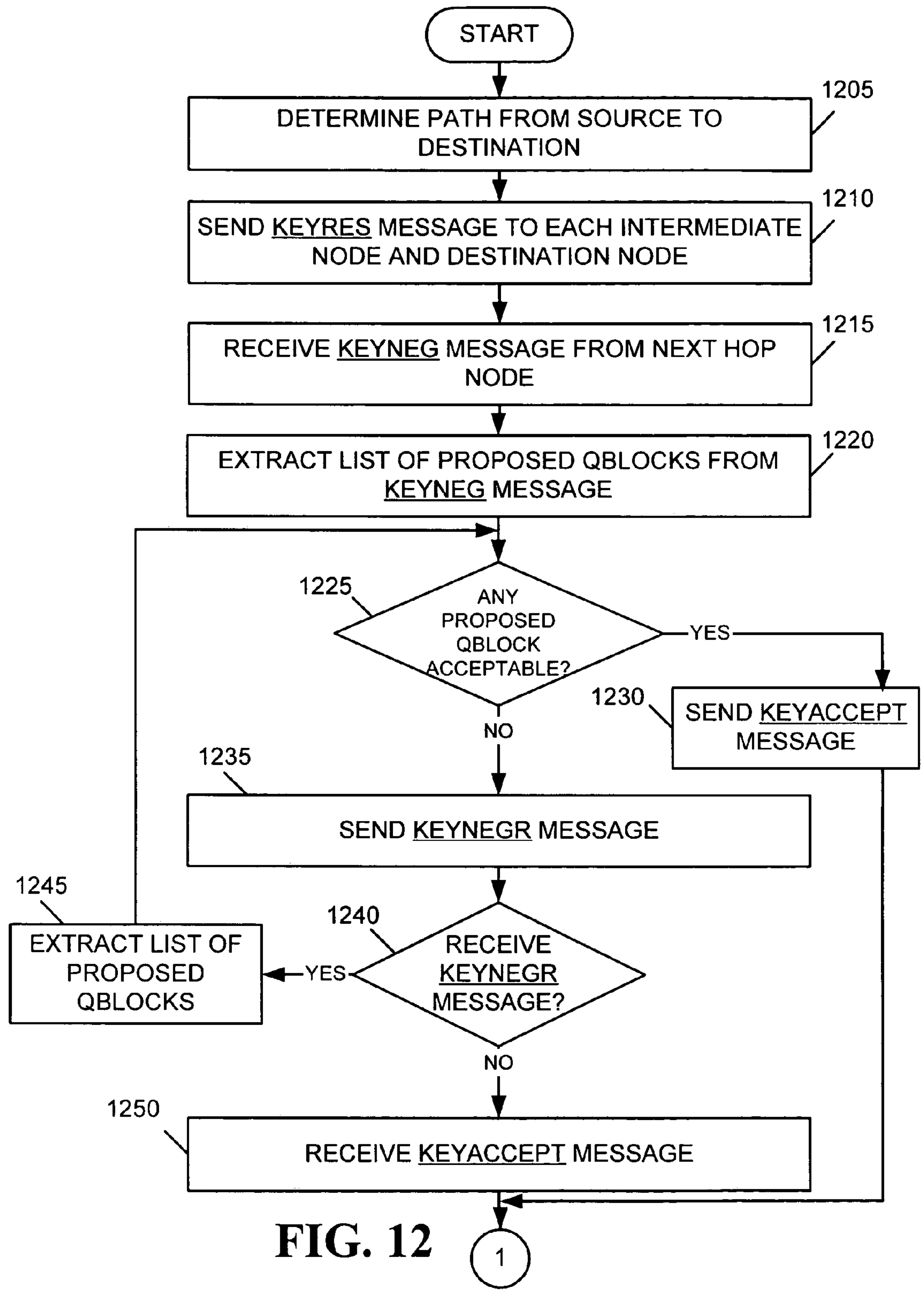
FIGS. 12-13 are flow charts that illustrate an exemplary process for implementing key transport at a source node consistent with the present invention.
Figure 13:
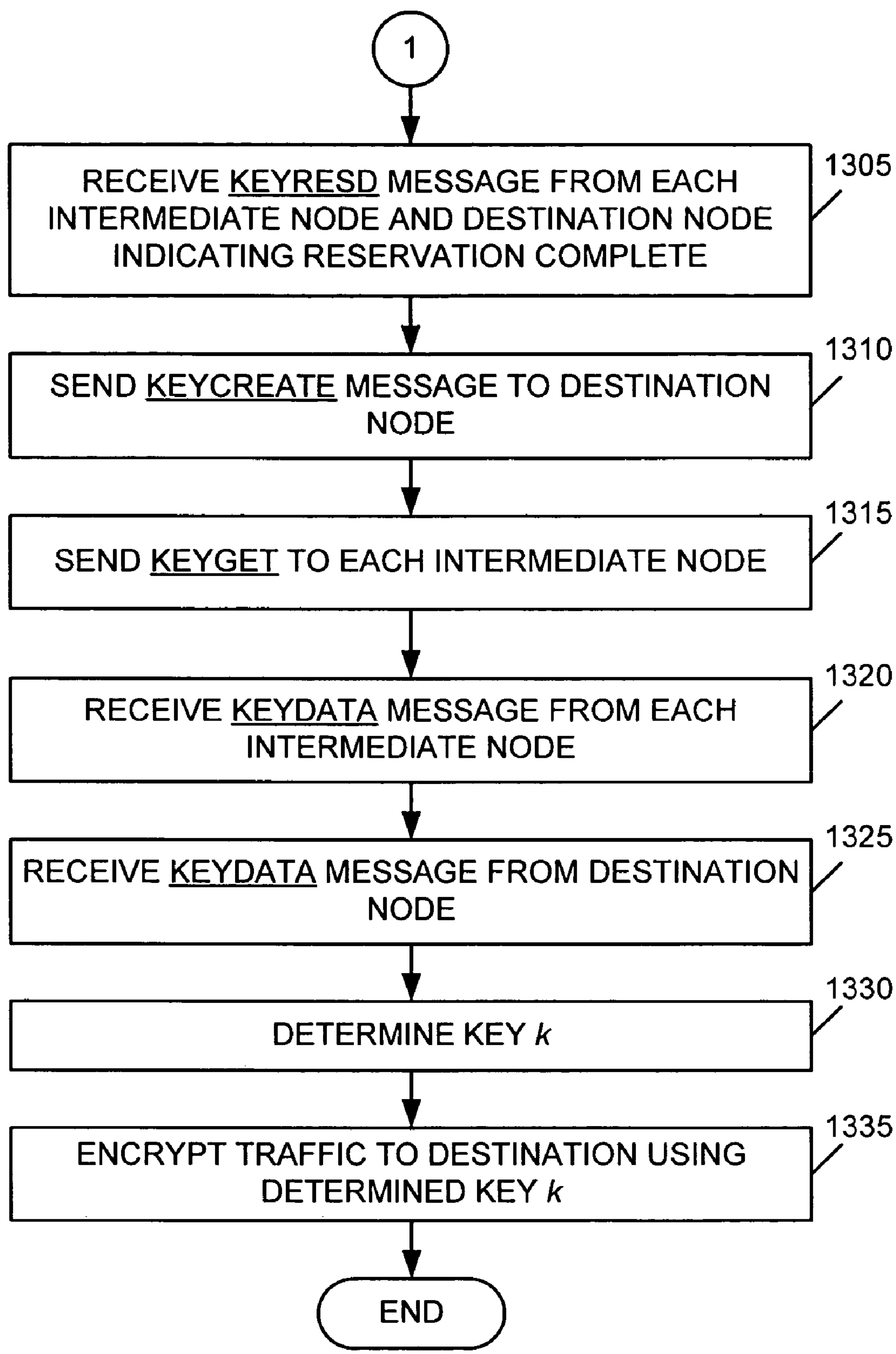

FIGS. 12-13 are flowcharts that illustrate an exemplary process, consistent with the present invention, for implementing key transport at a source node in QKD sub-network 115. As one skilled in the art will appreciate, the method exemplified by FIGS. 12-13 can be implemented as a sequence of instructions and stored in memory 610 of a QKD relay 205 or QKD endpoint 105, that may serve as a source of data traffic across sub-network 110, for execution by a processing unit 605.

The exemplary process may begin with the determination of a path from a source node (e.g., QKD endpoint 105*a*) to a destination node (e.g., QKD endpoint 105*b*) in QKD sub-network 115 [act 1205](FIG. 12). In some implementations, for example, the path may be selected in accordance with the exemplary routing protocols and algorithms disclosed in co-pending U.S. patent application Ser. No. 10/799,177, entitled "Systems and Methods for Implementing Routing Protocols and Algorithms for Quantum Cryptographic Key Transport." After determination of the path, the source node may send a KEYRES message 920 to each intermediate node, and the destination node, along the determined path [act 1210]. The KEYRES message 920 may include a source node identifier 925 that identifies, for example, QKD endpoint 105*a* as the originator of the message. The KEYRES message 920 may further include a node identifier 930 for a previous hop along the path and a job number 935 for a request sent to a previous hop along the path.

The source node may then receive a KEYNEG message 965 from the next hop node on the selected path [act 1215]. The received KEYNEG message 965 may include a list of proposed Qblocks 980 that the next hop node is proposing to use as a shared Qblock between the source node and the next hop node. The source node may extract the list of proposed Qblocks 980 from the KEYNEG message 965 [act 1220] and determine whether any of the proposed Qblocks in the list are acceptable [act 1225]. If so, the source node may return a KEYACCEPT message 995 to the next hop node [act 1230] identifying the acceptable Qblock from the list, and the exemplary process may continue at act 1305 below. If the proposed Qblock is not acceptable, then the source node may return a KEYNEGR message 985 to the next hop node [act 1235]. KEYNEGR message 985 may include a new list of proposed Qblocks 990 that the source node is proposing for use as a shared Qblock between the source node and the next hop node. In response to KEYNEGR message 985, the source node may determine if another KEYNEGR message 985 is received from the next hop node [act 1240]. If so, the source node may extract the list of proposed Qblocks [act 1245] and the exemplary process may continue at act 1225 above. If the nodes fail to negotiate a Qblock within a configurable timeout period, a failure message may be sent to all the other nodes along the selected path. The failure message may use a control protocol, thus, no special failure message may be used.

If a KEYNEGR message 985 is not received from the next hop node, the source node may subsequently receive a KEYACCEPT message 995 from the next hop node [act 1250]. The next hop node may send a KEYACCEPT message 995 to the source node if the next hop node accepts one of the identified Qblocks in KEYNEGR message 985 that was sent from the source node to the next hop node. KEYACCEPT message 995 from the next hop node may identify the accepted Qblock from the list of proposed Qblocks sent from the source node.

The source node may then receive a KEYRESD message from each intermediate node, and the destination node, in the selected path indicating that Qblock reservations are complete [act 1305](FIG. 13). The source node may then send a KEYCREATE message 950 to the destination node [act 1310]. KEYCREATE message 950 may include a number to assign to a generated key k 955 and, optionally, job numbers of reservations 960 for other paths if multiple paths across sub-network 115 are being employed. The source node may further send a KEYGET message to each intermediate node [act 1315]. In response to the KEYGET message, the source node may receive a KEYDATA message 940 from each intermediate node [act 1320]. KEYDATA message 940 from each intermediate node may include a XOR of Qblocks 945 shared between each intermediate node and a respective intermediate node's previous hop and next hop node. Also, in response to KEYCREATE message 950, the source node may receive a KEYDATA message 940 from the destination node [act 1325]. KEYDATA message 940 from the destination node may include a XOR of a Qblock shared with a previous hop node and the generated key k. The source node may then determine the key k [act 1330] using, for example, the following relation:

$$k=a_1\oplus(a_1\oplus a_2)\oplus(a_2\oplus a_3)\oplus\ldots\oplus(a_{n-1}\oplus k) \qquad \text{Eqn. (2)}$$

where n equals the number of nodes in the path between the source and destination (including the source and destination nodes) and where $a_i$ equals a Qblock reserved between each ith and ith+1 node along a selected path through sub-network 115. One skilled in the art will recognize, however, that any other type of associative, mathematical function, instead of XOR, may be used to determine the key k. The source node may then encrypt traffic sent to the destination node via sub-network 110 using the determined key k [act 1335].

Exemplary Intermediate Node Key Transport Process

Figure 14:
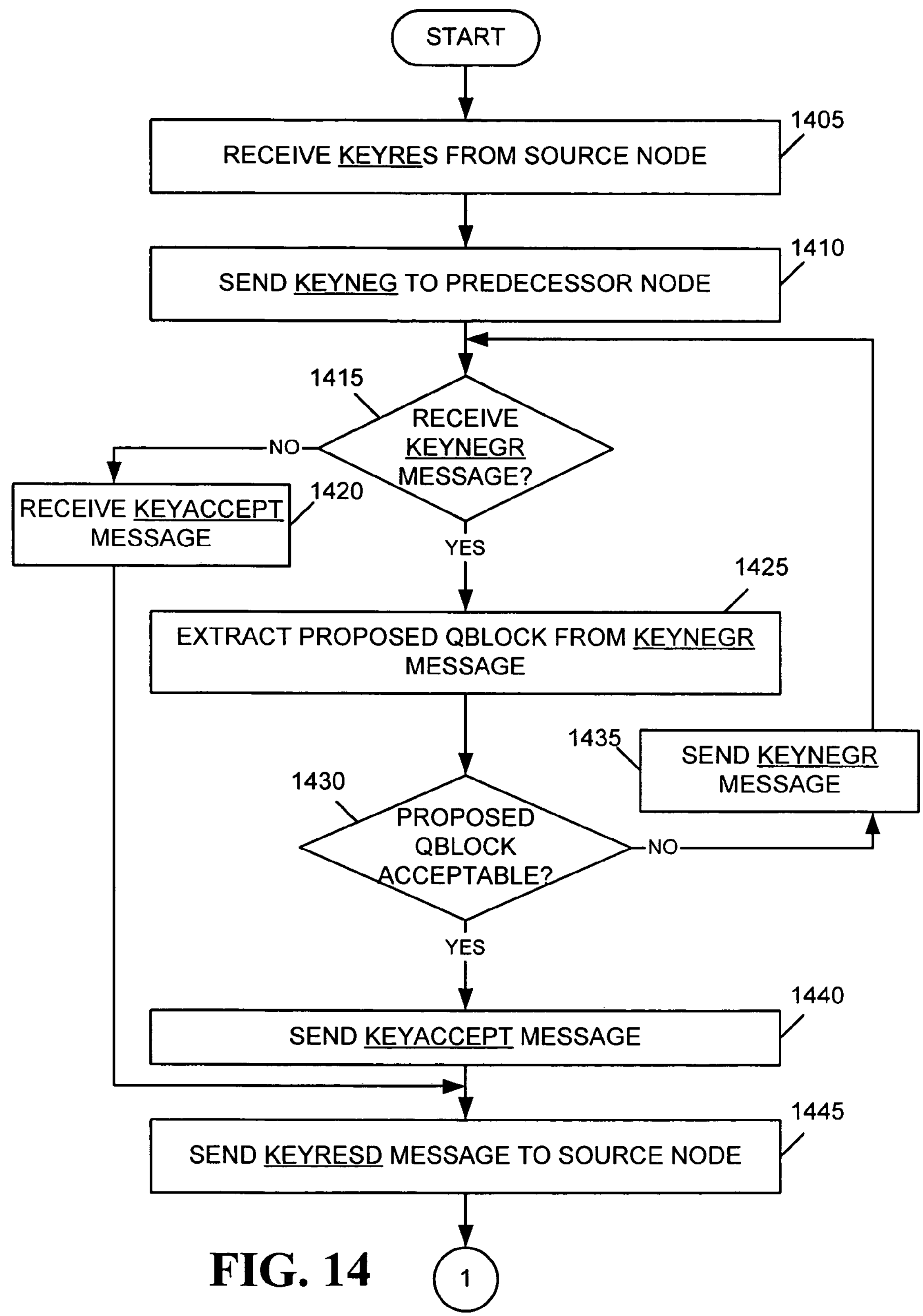
FIGS. 14-15 are flow charts that illustrate an exemplary process for implementing key transport at an intermediate node consistent with the present invention.
Figure 15:
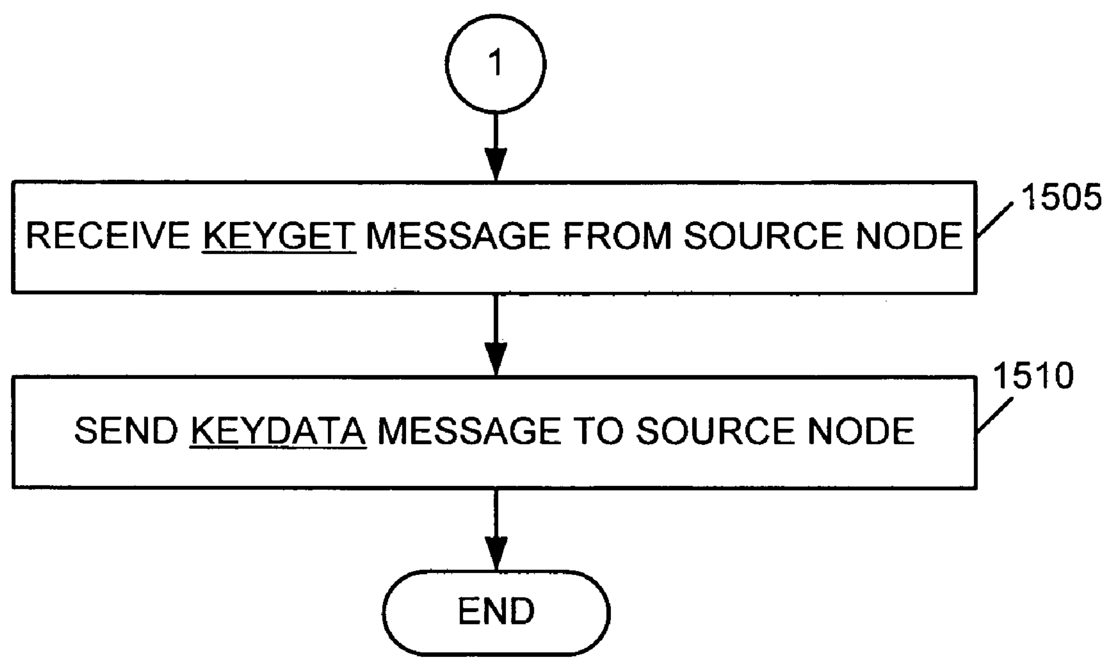

FIGS. 14-15 are flowcharts that illustrate an exemplary process, consistent with the present invention, for implementing key transport at an intermediate key transport node in a path through QKD sub-network 115. As one skilled in the art will appreciate, the method exemplified by FIGS. 14-15 can be implemented as a sequence of instructions and stored in memory 610 of a QKD relay 205, that is an intermediate node, between a source node and a destination node, along a path through QKD sub-network 115, for execution by a processing unit 605.

The exemplary process may begin with the receipt of a KEYRES message 920 from a source node (e.g., QKD endpoint 105*a*) at an intermediate node along a path through QKD sub-network 115 [act 1405]. The received KEYRES message 920 may include a source node identifier 925 of the source node, a node identifier of a previous hop 930 along the selected path, and a job number of a reservation request sent to a previous hop along the selected path. In response to receipt of KEYRES message 920, the intermediate node may send a KEYNEG message 965 to a predecessor node (i.e., a previous hop along the path through QKD sub-network 115) [act 1410]. KEYNEG message 965 may include a node identifier 970 that identifies the source node that initiated the reservation process, a job number 975 the source node used for the intermediate node sending the KEYNEG message 965, and a list of Qblocks 980 proposed to be used by the intermediate node.

The intermediate node may determine whether a KEYNEGR message 985 is subsequently received from the predecessor node [act 1415]. If not, and a KEYACCEPT message 995 is received [act 1420] indicating the predecessor node's acceptance of one of the Qblocks of the list of proposed Qblocks, the exemplary process may continue at act 1445 below. If neither a KEYNEGR message 985 nor a KEYACCEPT message 995 is received from the predecessor node, the intermediate node may send a failure message (not shown) to the source node, which may then propagate the failure to all the other nodes of the selected path so that these nodes may release any reserved blocks. Failure may also occur if the intermediate node and the predecessor node fail to negotiate a Qblock within a configurable time period. Failure messages may use a control protocol, thus, there may be no special failure message.

If a KEYNEGR message 985 is received, then the intermediate node may extract a list of proposed Qblocks 990 from the message [act 1425]. The intermediate node may then determine whether any of the proposed Qblocks are acceptable [act 1430]. If none of the proposed Qblocks are acceptable, then the intermediate node may send a KEYNEGR message 985 to the predecessor node [act 1435] that includes a new list of Qblocks proposed by the intermediate node for use with the predecessor node, and the exemplary process may continue at act 1415. If any of the proposed Qblocks are acceptable, then the intermediate node may send a KEYACCEPT message 995 to the predecessor node [act 1440] identifying the Qblock of the list of Qblocks that is acceptable.

The intermediate node may send a KEYRESD message to the source node indicating that a Qblock has been reserved [act 1445] and that the requested reservation process is complete. The intermediate node may then receive a KEYGET message from the source node [act 1505](FIG. 15). In response to receipt of the KEYGET message, the intermediate node may send a KEYDATA message 940 to the source node [act 1510] to complete the intermediate node key transport process. KEYDATA message 940 may include an XOR of Qblocks shared with a previous hop node (i.e., the predecessor node) and a next hop node.

Exemplary Destination Node Key Transport Process

Figure 16:
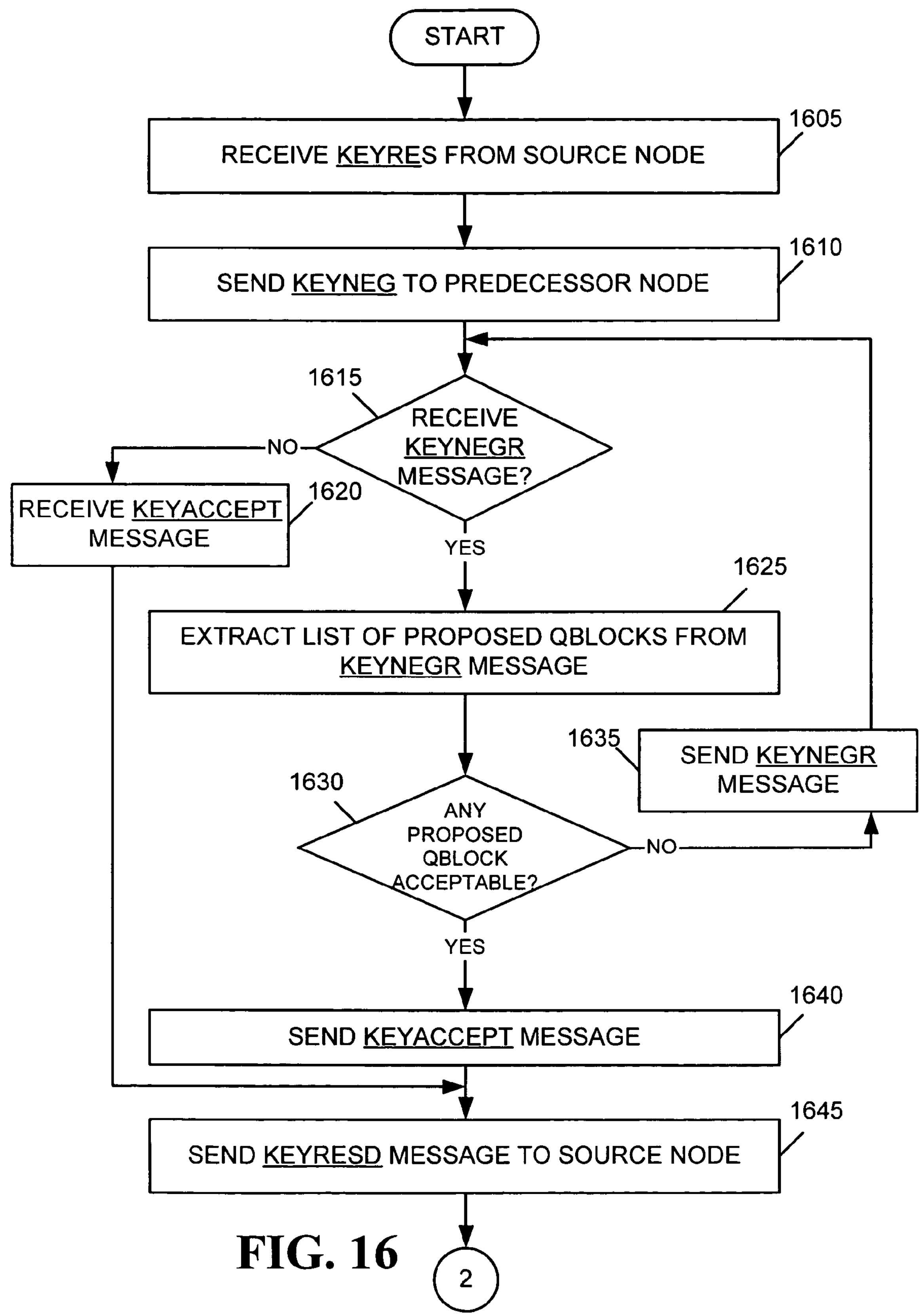
FIGS. 16-17 are flow charts that illustrate an exemplary process for implementing key transport at a destination node consistent with the present invention.
Figure 17:
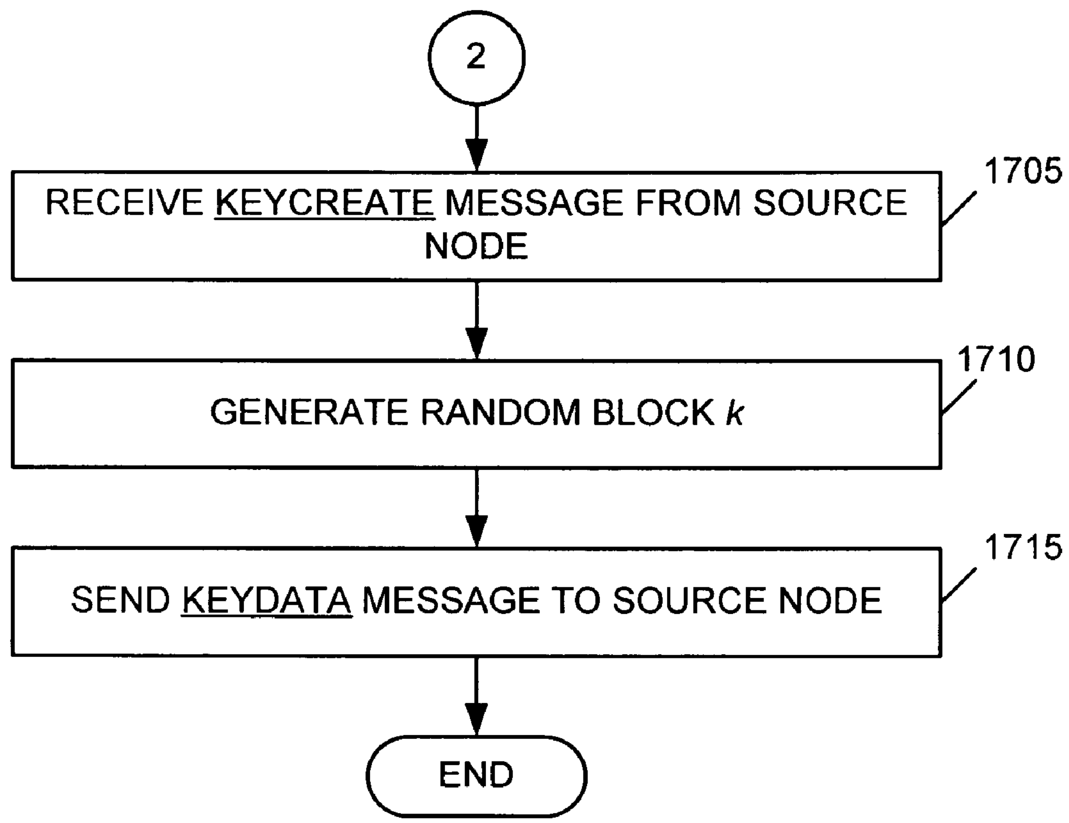

FIGS. 16-17 are flowcharts that illustrate an exemplary process, consistent with the present invention, for implementing key transport at a destination node in a path through QKD sub-network 115. As one skilled in the art will appreciate, the method exemplified by FIGS. 16-17 can be implemented as a sequence of instructions and stored in memory 610 of a QKD relay 205 or a QKD endpoint 105, that is a destination node for data traffic sent from a source node via sub-network 10, for execution by a processing unit 605.

The exemplary process may begin with the receipt of a KEYRES message 920 from a source node (e.g., QKD endpoint 105*a*) at the destination node (e.g., QKD endpoint 105*b*) [act 1605]. KEYRES message 920 may include an identifier 925 that identifies the source node, a node identifier 930 of a previous hop in a selected path, and a job number 935 of a reservation request sent to a previous hop. In response to receipt of KEYRES message 920, the destination node may send a KEYNEG message 965 to a predecessor node (i.e., a previous hop node in the path through QKD sub-network 15) [act 1610]. KEYNEG message 965 may include an identifier 970 that identifies the source node that originated the reservation request, a job number 975 the source node used for the recipient, and a list of proposed Qblocks 980. The destination node may then determine whether a KEYNEGR message 985 is subsequently received from the predecessor node [act 1615] indicating that none of the Qblocks proposed by the destination node are acceptable to the predecessor node. If not, and a KEYACCEPT message 995 is received [act 1620], then the exemplary process may continue at act 1645 below.

If a KEYNEGR message 985 is received from the predecessor node, the destination node may extract a list of proposed Qblocks from the KEYNEGR message 985 [act 1625]. The destination node may determine whether any Qblocks from the list of proposed Qblocks are acceptable [act 1630]. If not, the destination node may return a KEYNEGR message 985 to the predecessor node [act 1635]. This KEYNEGR message 985 may include another list of proposed Qblocks for consideration by the predecessor node. If the nodes fail to negotiate a Qblock within a configurable time period, a failure message may be sent to all the other nodes along the selected path. The failure message may use a control protocol, thus, there may be no special failure message.

If one of the Qblocks from the list of proposed Qblocks is acceptable, then the destination node may send a KEYACCEPT message 995 to the predecessor node [act 1640] indicating the Qblock from the list of proposed Qblocks that is acceptable to the destination node. The destination node may then send a KEYRESD message to the source node indicating that reservation of a Qblock with the predecessor node is complete [act 1645].

Subsequent to sending the KEYRESD message to the source node, the destination node may receive a KEYCREATE message 950 from the source node [act 1705](FIG. 17). KEYCREATE message 950 may designate an identifier to be used by the destination node for subsequently identifying a generated random key block k. The destination node may then generate the random block k of bits [act 1710]. The destination node may use, for example, any conventional random bit generating algorithm. The destination node may then send a KEYDATA message 940 to the source node [act 1715] that includes an XOR of the randomly generated block k of bits and the Qblock reserved with the destination node's predecessor node. One skilled in the art will recognize, however, that any other type of associative, mathematical function, instead of XOR, may be used to combine the randomly generated block k of bits and the Qblock reserved with the destination node's predecessor node.

CONCLUSION

Systems and methods consistent with the present invention, therefore, provide mechanisms for transporting keys from end-to-end across a QKD network. Consistent with the invention, a source node may initiate a reservation process that reserves secret blocks of bits that have been transmitted between nodes in the QKD network in a pair-wise fashion using quantum cryptographic mechanisms. The reserved secret blocks of bits may subsequently be used for transporting a key from the destination node to the source node. The transported key may be used for encrypting traffic sent between the source node and the destination node across a public channel.

The foregoing description of implementations of the present invention provides illustration and description, but is not intended to be exhaustive or to limit the invention to the precise form disclosed. Modifications and variations are possible in light of the above teachings or may be acquired from practice of the invention. For example, the exemplary key transport of the present invention may keep a record of what nodes where involved in transporting each key block, and at what time it was transmitted, so that this information can be audited later, either to determine what other data may have been compromised by a "hijacked" relay or, possibly, to make deductions about what relays may have been compromised if information has been leaked to an adversary.

While series of acts have been described in FIGS. 12-17, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method of transporting a random block of bits in a quantum cryptographic key distribution (QKD) network, comprising:

sharing blocks of bits between nodes in a QKD network using quantum cryptographic mechanisms;

determining a key transport path between a source node and a destination node in the QKD network, wherein the key transport path comprises one or more intermediate nodes;

at each intermediate node of the one or more intermediate nodes, logically combining a block of secret bits shared with a previous hop along the path with a block of secret bits shared with a next hop along the path to produce first combined blocks of bits;

at the destination node, logically combining a block of secret bits shared with a previous hop along the path with a random block of bits to produce a second combined block of bits;

receiving the first combined blocks of bits and the second combined block of bits at the source node; and logically combining, at the source node, the first combined blocks of bits and the second combined block of bits to determine the random block of bits.

2. The method of claim 1, further comprising:

using the random block of bits to encrypt data sent between the source node and the destination node.

3. The method of claim 1, where logically combining, at each intermediate node, the block of secret bits shared with the previous hop along the path with the block of secret bits shared with the next hop along the path comprises:

combining the secret block of bits shared with the previous hop with the block of secret bits shared with the next hop along the path using an associative, invertible mathematical function.

4. The method of claim 3, where logically combining, at the destination node, the block of secret bits shared with the previous hop along the path with the random block of bits further comprises:

combining the secret block of bits shared with the previous hop along the path with the random block of bits using the mathematical function.

5. The method of claim 4, where logically combining the first combined blocks of bits and the second combined block of bits comprises:

combining selected blocks of bits of the first combined blocks of bits and the second combined block of bits, using the mathematical function, to determine the random block of bits.

6. The method of claim 5, where the associative, invertible mathematical function comprises a logical exclusive OR.

7. A method of transporting a key between a first node at one end of a path through a quantum cryptographic key distribution (QKD) network to a second node at an opposite end of the path, the QKD network comprising a plurality of nodes, the method comprising:

transmitting secret bits between the plurality of nodes of the QKD network using quantum cryptographic mechanisms;

reserving, from the first node, portions of the transmitted secret bits at each intermediate node along the path between the first and the second node; and transporting a key between the second node and the first node using the reserved portions of the transmitted secret bits.

8. The method of claim 7 where transmitting secret bits between the plurality of nodes further comprises:

transmitting different secret bits between different pairs of nodes of the plurality of nodes.

9. The method of claim 8, where reserving the portions further comprises:

reserving portions of the transmitted different secret bits between each pair of nodes of the different pairs of nodes.

10. The method of claim 7 further comprising:

sending the reserved portions of the transmitted key symbols to the first node.

11. The method of claim 7 further comprising:

sending a reservation message from the first node to each intermediate node along the path.

12. The method of claim 11 further comprising:

reserving a respective portion of the portions of the transmitted secret bits at each intermediate node in response to each reservation message.

13. The method of claim 12 further comprising:

receiving, at the first node, a respective portion of the portions of the transmitted secret bits from each intermediate node in response to each reservation message.

14. The method of claim 13 further comprising:

receiving, at the first node, a respective portion of the portions of the transmitted secret bits, logically combined with the key, from the second node.

15. The method of claim 14 further comprising:

determining, at the first node, the key using the respective portions of the transmitted secret bits received from the second node and each intermediate node.

16. A computer-readable medium containing instructions for controlling at least one processor to perform a method of transporting a key across a quantum cryptographic key distribution (QDK) network, the method comprising:

reserving portions of key symbols, transmitted between nodes in the QKD network via quantum cryptographic mechanisms, at each node along a path across the QKD network; and using the reserved portions of the transmitted key symbols to determine an encryption key for encrypting data sent between nodes at either end of the path.

17. A node at a first end of a path in a quantum cryptographic key distribution (QKD) network, comprising:

a memory to store instructions, processing logic to execute the instructions to:

reserve portions of key symbols, transmitted between nodes in the QKD network via quantum cryptographic mechanisms, at each node along a path across the QKD network, and one or more interfaces to:

receive the reserved portions of key symbols, the processing logic to further:

use the reserved portions of the transmitted key symbols to determine an encryption key for encrypting data sent to another node at a second end of the path.

18. A method of employing blocks of secret bits in communicating between a source node and a destination node in a network, comprising:

transmitting the blocks of secret bits between each node along a path between the source node and the destination node using quantum cryptographic mechanisms, wherein a different block of secret bits of the blocks of secret bits is transmitted between each different link that connects each node along the path;

initiating a reservation process, at the source node, the reservation process reserving at least a portion of the blocks of secret bits at each node along a path between the source node and the destination node; and employing the reserved blocks of secret bits in subsequent public communication between the source node and the destination node.

19. A system for transporting a key between a first node at one end of a path through a quantum cryptographic key distribution (QKD) network to a second node at an opposite end of the path, the QKD network comprising a plurality of nodes, comprising:

means for transmitting secret bits between the plurality of nodes of the QKD network using quantum cryptographic mechanisms;

means for reserving, from the first node, portions of the transmitted secret bits at each intermediate node along the path between the first and the second node; and means for transporting a key between the second node and the first node using the reserved portions of the transmitted secret bits.

20. A method of sharing data with a first endpoint in a path between the first endpoint and a second endpoint in a quantum cryptographic network, comprising:

sharing a first block of data with a preceding neighboring node in the path using quantum cryptographic mechanisms;

sharing a second block of data with a subsequent neighboring node in the path using quantum cryptographic mechanisms;

logically combining the first and second block of bits to produce a result;

receiving a message from the first endpoint; and sending the results to the first endpoint based on receipt of the message.

21. A relay node in a path between a first endpoint and a second endpoint in a quantum cryptographic network, comprising:

a quantum cryptographic transceiver to:

share a first block of data with a preceding neighboring node in the path using quantum cryptographic mechanisms, and share a second block of data with a subsequent neighboring node in the path using quantum cryptographic mechanisms;

a memory to store instructions;

processing logic to execute the instructions to:

logically combine the first and second block of bits to produce a result; and an interface to:

receive a message from the first endpoint, and send the results to the first endpoint based on receipt of the message.

22. A method of transporting a secret key along a portion of a path between a first quantum cryptographic endpoint and a second quantum cryptographic endpoint in a quantum cryptographic system, comprising:

sharing a first block of data with a neighboring node in the path between the first quantum cryptographic endpoint and the second cryptographic endpoint using quantum cryptographic mechanisms;

receiving a second block of data from the neighboring node, wherein the second block of data comprises a secret key logically combined with the first block of data; and logically combining the second block of data with the first block of data to recover the secret key.

23. The method of claim 22, where the second block of data comprises a secret key exclusively ORed with the first block of data.

24. The method of claim 23, where the logically combining comprises:

exclusively ORing the second block of data with the first block of data to recover the secret key.

25. A relay node in a path between a first endpoint and a second endpoint in a quantum cryptographic system, comprising:

a quantum cryptographic transceiver to:

share a first block of data, using quantum cryptographic mechanisms, with a neighboring node in the path between the first endpoint and the second endpoint;

an interface to:

receive a second block of data from the neighboring node, wherein the second block of data comprises a secret key logically combined with the first block of data;

a memory to store instructions; and processing logic to execute the instructions to:

logically combine the second block of data with the first block of data to recover the secret key.

* * * * *